US012533579B2

(12) United States Patent
Sato

(10) Patent No.: US 12,533,579 B2
(45) Date of Patent: Jan. 27, 2026

(54) NON-TRANSITORY STORAGE MEDIUM, INFORMATION PROCESSING METHOD, INFORMATION PROCESSING APPARATUS, AND INFORMATION PROCESSING SYSTEM

(71) Applicant: NINTENDO CO., LTD., Kyoto (JP)

(72) Inventor: Shintaro Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 271 days.

(21) Appl. No.: 18/340,475

(22) Filed: Jun. 23, 2023

(65) Prior Publication Data

US 2024/0033622 A1 Feb. 1, 2024

(30) Foreign Application Priority Data

Jul. 27, 2022 (JP) ................................ 2022-120039

(51) Int. Cl.
*A63F 13/34* (2014.01)
*A63F 13/53* (2014.01)
*A63F 13/79* (2014.01)

(52) U.S. Cl.
CPC .............. *A63F 13/34* (2014.09); *A63F 13/53* (2014.09); *A63F 13/79* (2014.09)

(58) Field of Classification Search
CPC ...... A63F 13/87; A63F 13/847; A63F 13/795; A63F 13/79; A63F 13/5375; A63F 13/53; A63F 13/34; A63F 13/30
See application file for complete search history.

(56) References Cited

U.S. PATENT DOCUMENTS 6,220,964 B1 * 4/2001 Miyamoto .............. A63F 13/23 463/43
2016/0136523 A1 * 5/2016 Yano ..................... A63F 13/355 463/31

(Continued)

FOREIGN PATENT DOCUMENTS

JP 2003-088677 3/2003
JP 2011-098013 5/2011

(Continued)

OTHER PUBLICATIONS

Apr. 30, 2024 Office Action issued in Japanese Patent Application No. 2022-120039, pp. 1-6 [machine translation included].

(Continued)

*Primary Examiner* — Mihir K Rayan
(74) *Attorney, Agent, or Firm* — Nixon & Vanderhye P.C.

(57) ABSTRACT

An information processing program contained in a non-transitory storage medium is executed by a computer of a first terminal of a first user among a plurality of networkable terminals. The information processing program causes the computer to function as: status information acquisition means 34 for acquiring status information from a second terminal of a second user; other user character placement means 51 for placing second user character associated with the second user of the second terminal that has sent the acquired status information in a virtual space in a specified scene in a specified application; user character control means 52 for controlling a first user character associated with a first user and placed in the virtual space, and moving the first user character based on the first user's move operation input; and list image presentation means 54 for, if a specified operation input is given by the first user in the specified scene, presenting a list image for listing notifications about the acquired status information.

20 Claims, 21 Drawing Sheets

(56) References Cited

U.S. PATENT DOCUMENTS

| | | | | |
|---|---|---|---|---|
| 2018/0169528 | A1* | 6/2018 | Hinoshita | A63F 13/795 |
| 2022/0311732 | A1* | 9/2022 | Murata | H04W 4/12 |

FOREIGN PATENT DOCUMENTS

| | | |
|---|---|---|
| JP | 2012011227 A | 1/2012 |
| JP | 2016-002413 | 1/2016 |
| JP | 2018-094208 | 6/2018 |
| JP | 2019-037305 | 3/2019 |
| JP | 2021-058368 | 4/2021 |
| JP | 2022-078744 | 5/2022 |
| WO | 2014/196135 | 12/2014 |

OTHER PUBLICATIONS

Co-op mode play of TGS 2017 Metal Gear Survive What is the appeal of Metal Gear's evolution as survival action?; https://www.4gamer.net/games/353/G035307/20170923011/ Sep. 23, 2017; p. 1-6.

* cited by examiner

20

Program storage area

Server-apparatus-side program

Connected user storage area

| User ID | User name | User character | String | Friend ID |
|---|---|---|---|---|
| U0001 | Takashi | Takashi. | Akazukin | U06352<br>U01543 |
| ⋮ | ⋮ | ⋮ | | ⋮ |

Status information storage area

| String | User ID | Reception time | Type | Contents |
|---|---|---|---|---|
| Akazukin | U0473 | 10:40:12 | Group | Has joined session (Host) |
| Akazukin | U0537 | 10:40:16 | Status update | Has reached Level 14 |
| Shirayuki hime | U0185 | 10:41:34 | Group | Has joined session (Guest) |
| ⋮ | ⋮ | ⋮ | | ⋮ |

*FIG. 3*

40

Program storage area

User-terminal-side program

String storage area

| Specification | String |
|---|---|
| ○ | Akazukin |
| | Shirayuki hime |
| | Usagi to Kame |
| ⋮ | ⋮ |

Status information storage area

| User ID | User name | Type | Contents |
|---|---|---|---|
| U0378 | Hiroshi | Group | Has joined session (Host) |
| U0647 | Kazuto | Status update | Has reached Level 14 |
| U0258 | Tomoki | Group | Has joined session (Guest) |
| ⋮ | ⋮ | ⋮ | ⋮ |

*FIG. 5*

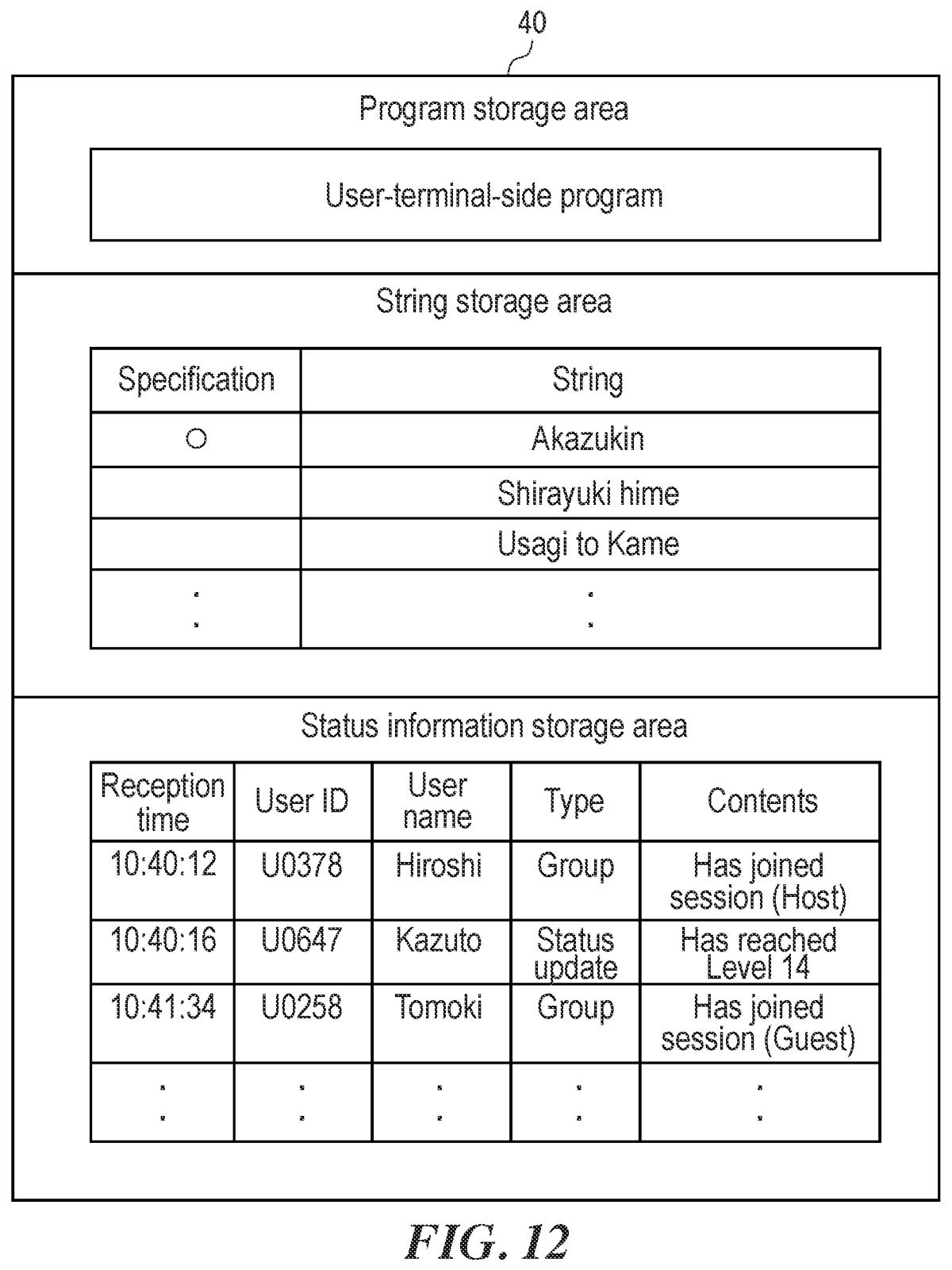

40

Program storage area

User-terminal-side program

String storage area

| Specification | String |
|---|---|
| ○ | Akazukin |
| | Shirayuki hime |
| | Usagi to Kame |
| : | : |

Status information storage area

| Reception time | User ID | User name | Type | Contents |
|---|---|---|---|---|
| 10:40:12 | U0378 | Hiroshi | Group | Has joined session (Host) |
| 10:40:16 | U0647 | Kazuto | Status update | Has reached Level 14 |
| 10:41:34 | U0258 | Tomoki | Group | Has joined session (Guest) |
| : | : | : | : | : |

*FIG. 12*

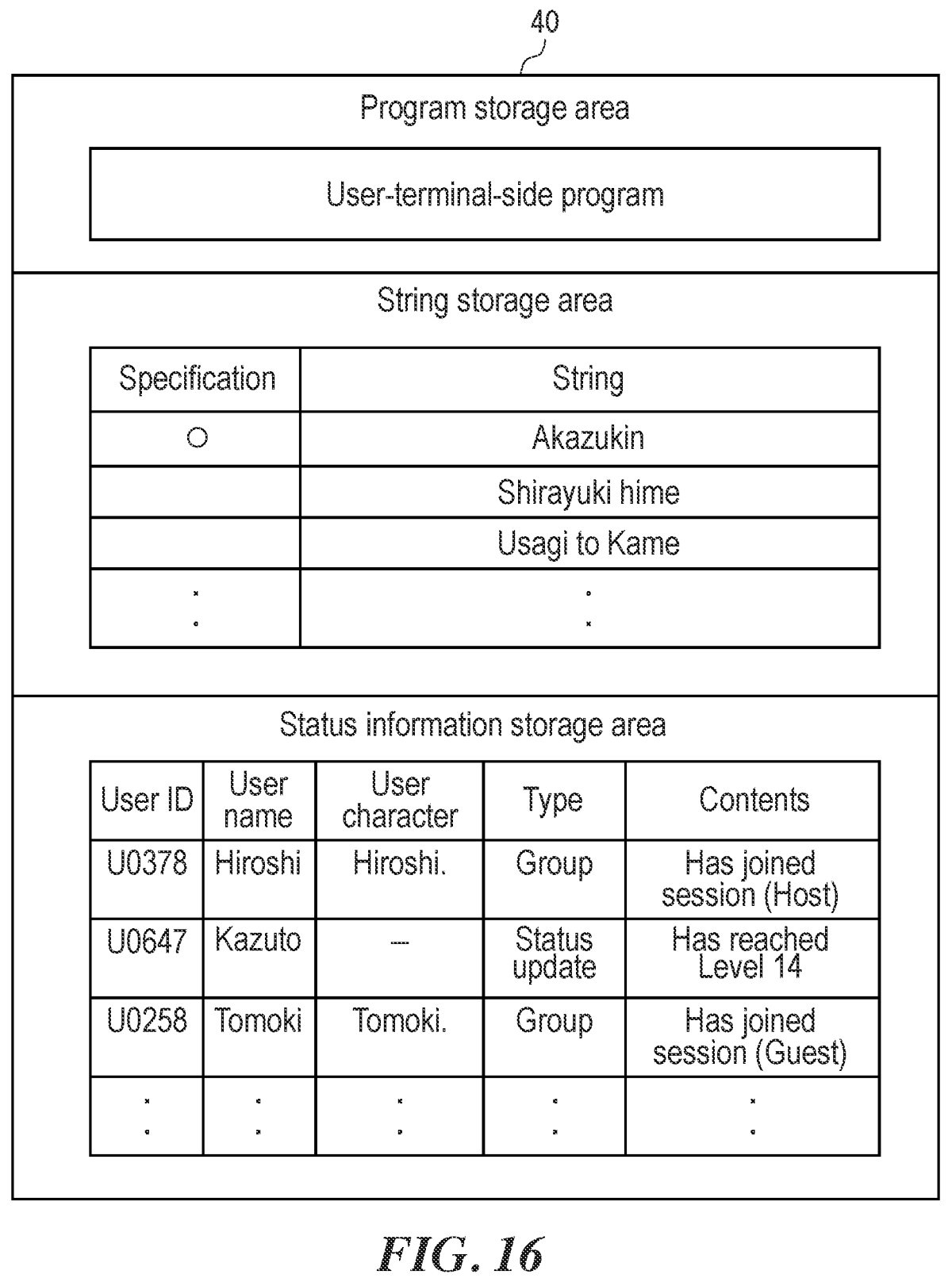

40

Program storage area

User-terminal-side program

String storage area

| Specification | String |
|---|---|
| ○ | Akazukin |
| | Shirayuki hime |
| | Usagi to Kame |
| ⋮ | ⋮ |

Status information storage area

| User ID | User name | User character | Type | Contents |
|---|---|---|---|---|
| U0378 | Hiroshi | Hiroshi. | Group | Has joined session (Host) |
| U0647 | Kazuto | — | Status update | Has reached Level 14 |
| U0258 | Tomoki | Tomoki. | Group | Has joined session (Guest) |
| ⋮ | ⋮ | ⋮ | ⋮ | ⋮ |

*FIG. 16*

NON-TRANSITORY STORAGE MEDIUM, INFORMATION PROCESSING METHOD, INFORMATION PROCESSING APPARATUS, AND INFORMATION PROCESSING SYSTEM

CROSS REFERENCE TO RELATED APPLICATION

This nonprovisional application is based on Japanese Patent Application No. 2022-120039 filed with the Japan Patent Office on Jul. 27, 2022, the entire contents of which are hereby incorporated by reference.

FIELD

The present disclosure relates to a non-transitory storage medium containing an information processing program, an information processing method, an information processing apparatus, and an information processing system which are used for games.

BACKGROUND AND SUMMARY

Recent development in the Internet environment has contributed to the increasing popularity of a form of gaming to play with other users connected through the Internet.

Japanese Patent Laid-Open Application No. 2012-11227 describes that when a game apparatus connects to the Internet, it queries a server apparatus of whether network communication can be performed with a person on a friend list registered in advance or not, and displays friends who can be communicated.

A purpose of the disclosure is to provide a new method that gives a feeling of connection with others connected to the Internet.

(Configuration 1)

A non-transitory storage medium of Configuration 1 stores instructions executed by a computer of a first terminal of a first user among a plurality of networkable terminals. The instructions cause the computer to perform operations comprising: executing a specified application and, while executing the specified application, acquiring, from a second terminal of a second user, status information indicating a status of the specified application being executed on the second terminal; placing a second user character associated with the second user of the second terminal that has sent the acquired status information in a virtual space in a specified scene in the specified application; controlling a first user character associated with the first user and placed in the virtual space, and moving the user character based on the first user's move operation input; if the first user character and the second user character are at least in a specified positional relationship in the virtual space, presenting a first image corresponding to the status information acquired from the second user of the second user character; if a specified operation input is given by the first user in the specified scene, presenting a list image for listing notifications about the acquired status information; and in a case where the list image is displayed, presenting a second image corresponding to information on a notification specified by the first user among the notifications listed in the list image.

This configuration allows for presenting the first image corresponding to the status information acquired from the second user if the user character moves in the virtual space and has the specified positional relationship with the second user character placed in the virtual space, and therefore allows the status information to be presented in a way that gives a feeling of connection with the second user. Additionally, since the list image lists notifications about the status information if the specified operation input is given by the user, the status information can be viewed more conveniently.

(Configuration 2)

A non-transitory storage medium of Configuration 2 stores the following instructions in addition to the instructions of Configuration 1: wherein in the operation of presenting a list image, presenting the list image for listing notifications about a first number of pieces of status information among the acquired status information, and wherein in the operation of placing a second user character, for each of a second number of pieces of status information among the acquired status information where the second number is smaller than the first number, placing in the virtual space the second user character of the second user of the second terminal that has sent the status information. This configuration can maintain the visibility of the virtual space by setting the number of second user characters placed in the virtual space to the second number that is smaller than the first number.

(Configuration 3)

A non-transitory storage medium of Configuration 3 stores the following instructions in addition to the instructions of Configuration 1 or 2: wherein in the operation of placing a second user character, for each of the second number of newly acquired pieces of status information among the acquired status information, placing in the virtual space the second user character of the second user of the second terminal that has sent the status information. This configuration allows second user characters to be displayed for new status information, and therefore offers a feeling of connection with the relevant second users in real time.

(Configuration 4)

A non-transitory storage medium of Configuration 4 stores the following instructions in addition to the instructions of any of Configurations 1 to 3: wherein in the operation of acquiring status information, acquiring the status information in at least one of cases where another scene has transitioned to the specified scene, where the list image has been presented based on the specified operation input, and where a specified period of time has elapsed since the list image was presented. Determining the timing of acquiring the status information in this way can prevent the status information associated with second user characters from changing while the first user character is moving toward the second user characters.

(Configuration 5)

A non-transitory storage medium of Configuration 5 stores the following instructions in addition to the instructions of any of Configurations 1 to 3: wherein in the operation of placing a second user character, maintaining a position of the second user character placed when a specified update condition was satisfied last time until the specified update condition is satisfied regardless of the status information acquired after the specified update condition was satisfied last time.

(Configuration 6)

A non-transitory storage medium of Configuration 6 stores the following instructions in addition to the instructions of any of Configurations 1 to 3: wherein in the operation of presenting a list image, maintaining the list image displayed when a specified update condition was satisfied last time until the specified update condition is satisfied regardless of the status information acquired after the specified update condition was satisfied last time.

(Configuration 7)

A non-transitory storage medium of Configuration 7 stores the following instructions in addition to the instructions of any of Configurations 1 to 6: where the status information may belong to at least two categories, and wherein in the operation of placing a second user character, placing in the virtual space the second user character of the second user of the second terminal that has sent the status information belonging to a specified category among the acquired status information. This configuration allows the first user to acquire the status information in the specified category while feeling connected with second users. The specified category may be determined, for example, depending on the status of the application of the specified user.

(Configuration 8)

A non-transitory storage medium of Configuration 8 stores the following instructions in addition to the instructions of Configuration 7: where the category may be the type of the specified scene, and wherein in the operation of placing a second user character, placing in the virtual space the second user character of the second user of the second terminal that has sent status information related to the specified scene of the present among the acquired status information. This configuration allows the first user to acquire the status information for the specified scene of the present while feeling connected with second users. The specified scene may include a variety of options such as, but not limited to, a scene where users play together cooperatively, a scene where users play on a one-on-one basis, and a scene where a user acquires second user's recent condition information.

(Configuration 9)

A non-transitory storage medium of Configuration 9 stores the following instructions in addition to the instructions of any of Configurations 1 to 8: where the number of second user characters placed in the virtual space is one or less for each second user, and wherein in the operation of presenting a list image, presenting a plurality of pieces of status information acquired from each second user. This configuration allows for avoiding the unnaturalness of having two or more identical second user characters placed in the virtual space. If a plurality of pieces of status information have been acquired from one second terminal of one second user, the latest piece of status information, for example, may also be chosen.

(Configuration 10)

A non-transitory storage medium of Configuration 10 stores the following instructions in addition to the instructions of any of Configurations 1 to 9: wherein in the operation of placing a second user character, displaying the second user character and an image indicating the type of the status information associated with the second user character.

This configuration allows for discriminating the type of the status information even if the first user character and the second user character are not in the specified positional relationship, and therefore allows the user to recognize what type of notifications are there at a glance. Additionally, the first user can determine whether the first user character approaches second user character and has the first image corresponding to the status information displayed or not after seeing the type of the status information.

(Configuration 11)

A non-transitory storage medium of Configuration 11 stores the following instructions in addition to the instructions of any of Configurations 1 to 10. The instructions may further cause the computer to perform operation of setting an arbitrary string specified by the first user in association with the first user, wherein in the operation of acquiring status information, acquiring the status information from second terminal of second user for whom the same string set in association with the first user is set.

This configuration allows for sending and receiving the status information indicating the status of the running specified application between the first terminal and the second terminal for both of which the same string is set, among a plurality of network-connected terminals. This allows the first user and the second user for both of whom the same string is set to play a game together, or to share the progress of the game. That is, a notification channel for exchanging the status information is formed between user terminals of users for whom an identical string is set. Using the same string, the user can send and receive the status information to and from second user who, for example, has similar likes and tastes or belongs to a community created in another social media platform. The user can play a game with another user different from those randomly matched or registered as friends.

(Configuration 12)

A non-transitory storage medium of Configuration 12 stores the following instructions in addition to the instructions of Configuration 11: wherein in the operation of setting an arbitrary string, setting a single string specified by the first user in association with the first user. Fixing the number of strings that can be specified to one in this way allows for controlling the communications traffic among users' terminals.

(Configuration 13)

A non-transitory storage medium of Configuration 13 stores the following instructions in addition to the instructions of any of Configurations 1 to 12, and may further cause the computer to perform operation: if the status information indicates that the second user has hosted a session, which is for playing a game with a plurality of people, or that the second user has joined as a guest a session hosted by a user different from the second user, allowing the first user to join the session by establishing communication at least between the first terminal and the second terminal in response to the first user's request to join the session.

(Configuration 14)

A non-transitory storage medium of Configuration 14 stores the following instructions in addition to the instructions of Configuration 13: wherein in the operation of establishing communication, establishing a peer-to-peer (P2P) network connection between the first terminal and the second terminal to allow the first user to join the session.

(Configuration 15)

A non-transitory storage medium of Configuration 15 stores the following instructions in addition to the instructions of any of Configurations 1 to 14: wherein in the operation of acquiring status information, acquiring the status information from the second terminal via a server.

(Configuration 16)

A non-transitory storage medium of Configuration 16 stores the following instructions in addition to the instructions of any of Configurations 1 to 15, wherein in the operation of acquiring status information, acquiring the status information indicating a status of the specified application on the second terminal after the user terminal has connected to the Internet.

This configuration can support connections between users who are connected to the Internet. In the information processing program of Configuration 16, in the operation of acquiring status information, the status information sent by the send terminal before the first terminal connects to the Internet may not be acquired.

(Configuration 17)

A non-transitory storage medium of Configuration 17 stores the following instructions in addition to the instructions of any of Configurations 1 to 16: the instruction may cause the computer to perform operation of placing a target object in the virtual space in the specified scene, accepting an operation input to cause the user character to perform a specified action, and destroying the target object if the specified action is performed on the target object. By causing the user character to perform the action to destroy the target object in the virtual space where the second user character is placed, the user can play while feeling connected with second users.

(Configuration 18)

An information processing apparatus of Configuration 18 is one of a plurality of networkable information processing apparatuses used by a first user comprises a processor and a memory coupled thereto, the processor being configured to control the information processing system to at least: executing a specified application and, while executing the specified application, acquiring, from a second terminal of a second user, status information indicating a status of the specified application being executed on the second terminal; placing second user character associated with the second user of the second terminal that has sent the acquired status information in a virtual space in a specified scene in the specified application; controlling a first user character associated with a first user and placed in the virtual space, and moving the first user character based on the first user's move operation input; if the first user character and the second user character are at least in a specified positional relationship in the virtual space, presenting a first image corresponding to the status information acquired from the second user of the second user character; if a specified operation input is given by the first user in the specified scene, presenting a list image for listing notifications about the acquired status information; and in a case where the list image is displayed, presenting a second image corresponding to information on a notification specified by the first user among the notifications listed in the list image.

(Configuration 19)

An information processing system of Configuration 19 includes a first terminal of a first user and a second terminal of a second user, wherein the first terminal comprises a processor and a memory coupled thereto, the processor being configured to control the first terminal to at least: executing a specified application and, while executing the specified application, acquiring, from second terminal of second user, status information indicating a status of the specified application being executed on the second terminal; placing second user character associated with the second user of the second terminal that has sent the acquired status information in a virtual space in a specified scene in the specified application; controlling a first user character associated with the first user and placed in the virtual space, and moving the first user character based on the first user's move operation input; if the first user character and the second user character are at least in a specified positional relationship in the virtual space, presenting a first image corresponding to the status information acquired from the second user of the second user character; if a specified operation input is given by the first user in the specified scene, presenting a list image for listing notifications about the acquired status information; and in a case where the list image is displayed, presenting a second image corresponding to information on a notification specified by the first user among the notifications listed in the list image.

(Configuration 20)

An information processing method of Configuration 20 is executed by a computer of a first terminal of a first user among a plurality of networkable terminals, and the information processing method comprises the steps of: executing a specified application and, while executing the specified application, acquiring, from second terminal of second user, status information indicating a status of the specified application being executed on the second terminal; placing second user character associated with the second user of the second terminal that has sent the acquired status information in a virtual space in a specified scene in the specified application; controlling a first user character associated with the first user and placed in the virtual space, and moving the first user character based on the first user's move operation input; if the first user character and the second user character are at least in a specified positional relationship in the virtual space, presenting a first image corresponding to the status information acquired from the second user of the second user character; if a specified operation input is given by the first user in the specified scene, presenting a list image for listing notifications about the acquired status information; and in a case where the list image is displayed, presenting a second image corresponding to information on a notification specified by the first user among the notifications listed in the list image.

(Configuration 21)

A non-transitory storage medium of Configuration 21 stores the following instructions in addition to the instructions of any of Configurations 1 to 10, wherein in the operation of acquiring status information, acquiring the status information from the other terminal of the other user having a friend relationship with the first user. This allows the user to acquire the status information of a friend while feeling connected with the friend. The other user having a friend relationship here means that the other user is registered as a friend. The relationship may be either a one-sided friend registration by the first user or the other user, or a mutual friend registration by both of them. Information on friend registrations may be managed in the specified application or by a terminal on which the specified application is executed.

(Configuration 22)

A non-transitory storage medium of Configuration 22 stores instructions in addition to the instructions of any of Configurations 1 to 15: where if the status information indicates that progress of an application executed on the second terminal satisfies a specified condition, in the operation of presenting the first image and in the operation of presenting second image, presenting a notification about the progress to the first user, and where the computer may further be caused to perform operation of sending data indicating the first user's reaction to the notification to the second terminal based on an operation performed by the first user in response to the notification.

This configuration allows the progress of the application executed on the second terminal to be known. For example, the first user can be notified of an increase in the second user's level and the second user's obtaining a new item as the progress. This configuration also allows for sending data on a reaction to the notification to the second terminal.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3 shows an example of a memory map of the server apparatus of the first embodiment.

FIG. 5 shows an example of a memory map of the user terminal of the first embodiment.

FIG. 12 shows an example of a memory map of the user terminal of the second embodiment.

FIG. 16 shows an example of a memory map of the user terminal of the third embodiment.

DETAILED DESCRIPTION OF NON-LIMITING EXAMPLE EMBODIMENTS

An information processing system of embodiments will now be described with reference to the drawings. The following description is merely illustrative of preferred modes, and is not intended to limit the disclosure described in the claims.

First Embodiment

Figure 1:
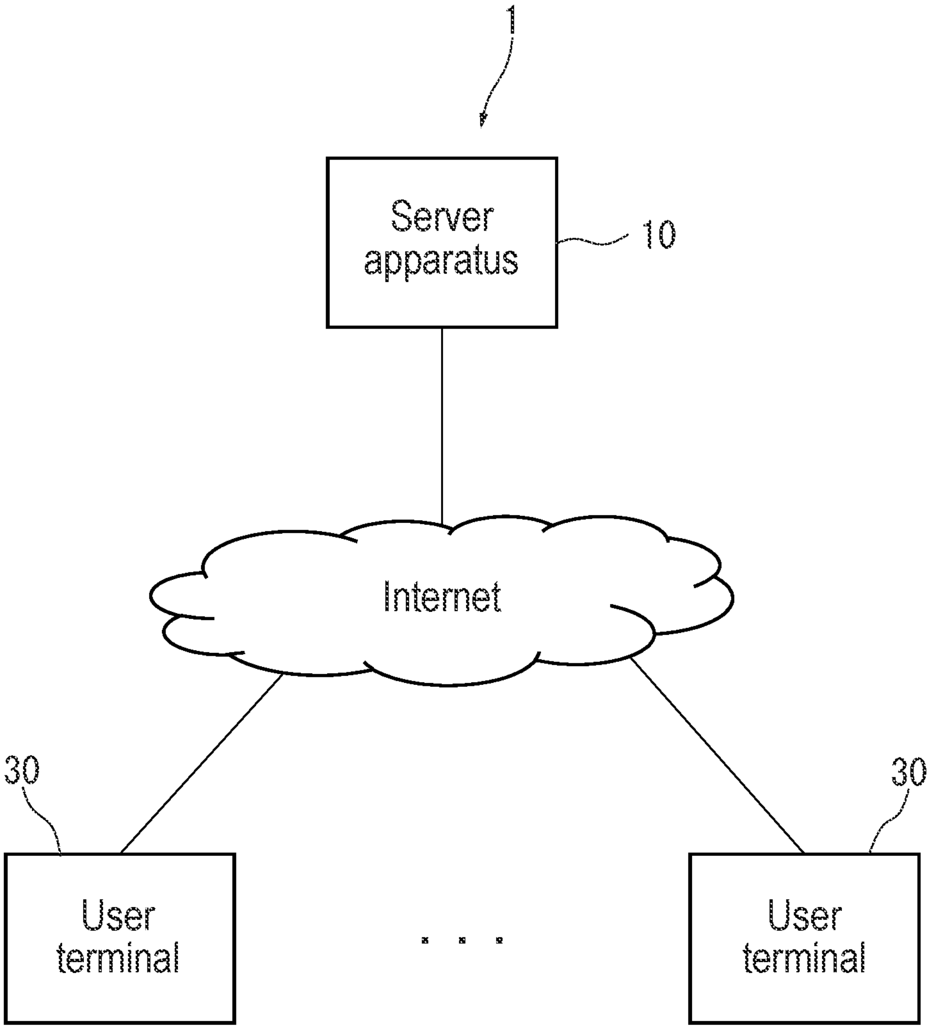
FIG. 1 shows a configuration of an information processing system of a first embodiment.

FIG. 1 shows a configuration of an information processing system 1 of a first embodiment. The information processing system 1 comprises a server apparatus 10 and a plurality of user terminals 30 connected through the Internet. The user terminals 30 are information processing apparatuses used by users, and are terminals that execute game processing. Note that there is no specific limitation on the contents of the games, and any game will do if it can be joined by a plurality of users. The user terminals 30 may be game-specific apparatuses, or information processing apparatuses which are general-purpose apparatuses, such as smartphones and tablet terminals, installed with an application for executing a game.

The information processing system 1 of the embodiment allows communications to be performed among a plurality of user terminals 30 connected to the server apparatus 10. Each user terminal 30 of the embodiment accepts a string setting from a user. Then, status information is sent and received among user terminals 30 for which the same string is set. That is, the server apparatus 10 functions as a hub for sending and receiving information on the status of the application among the user terminals 30 whose set strings are identical.

Figure 2:
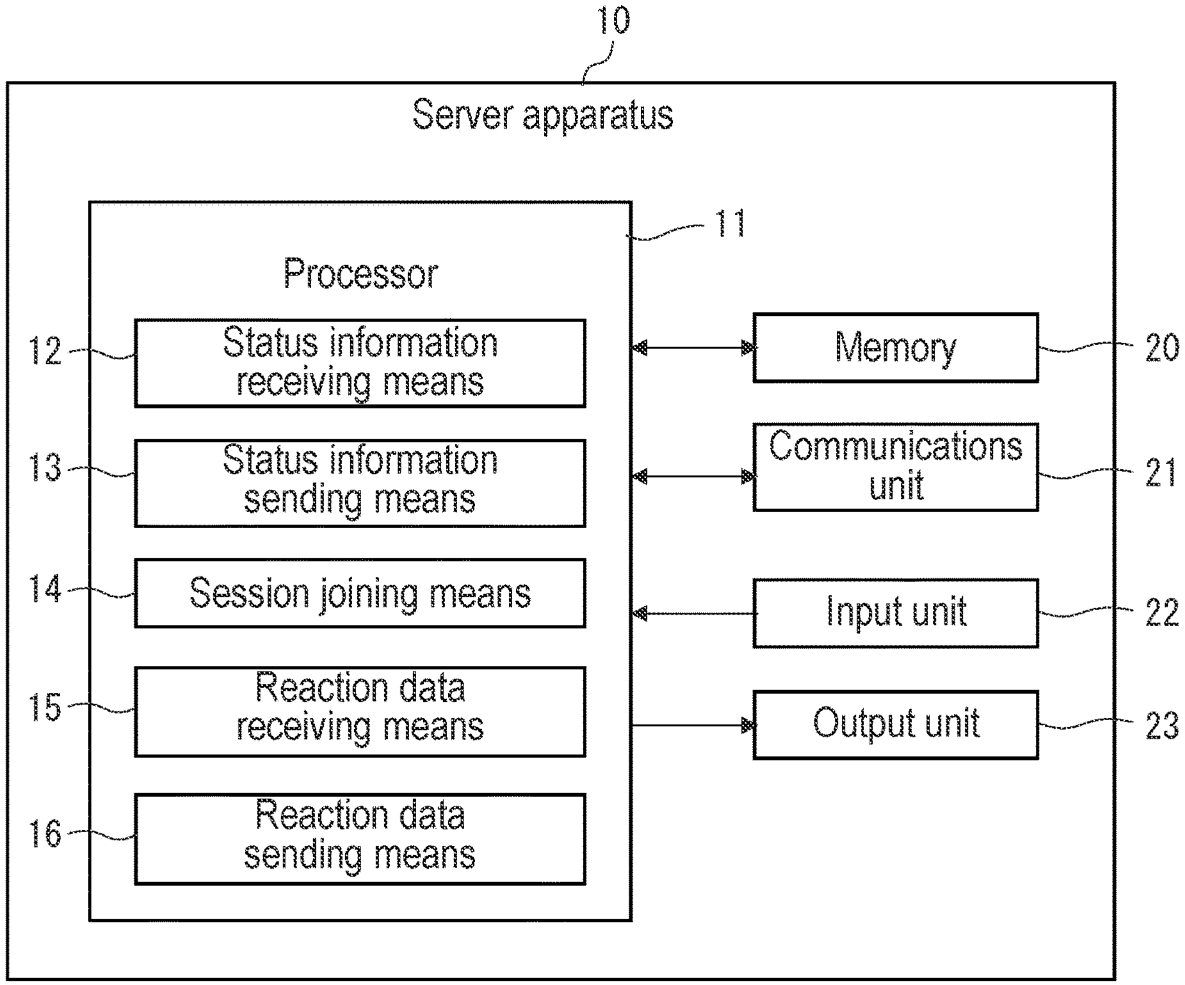
FIG. 2 shows a configuration of a server apparatus of the first embodiment.

FIG. 2 shows a configuration of the server apparatus 10. The server apparatus 10 has a processor 11, a memory 20, a communications unit 21, an input unit 22, and an output unit 23. The processor 11 reads and executes a server-apparatus-side program stored in the memory 20, thereby realizing each function of status information receiving means 12, status information sending means 13, session joining means 14, reaction data receiving means 15, and reaction data sending means 16. Each function realized by the processor 11 will be described in a description of the operation of the information processing system 1.

The communications unit 21 has a function to communicate with the user terminals 30. The input unit 22 is configured to have a function to accept data input and is, for example, a keyboard, a mouse, or the like. The output unit 23 is configured to have a function to output data and is, for example, a display.

FIG. 3 is a memory map showing an example of various data stored in the memory 20 of the server apparatus 10. The memory 20 of the server apparatus 10 has a program storage area, a connected user storage area, and a status information storage area. The memory 20 of the server apparatus 10 also has areas other than the areas illustrated in FIG. 3.

The program storage area contains the server-apparatus-side program for causing the server apparatus 10 to function. The server-apparatus-side program realizes the status information receiving means 12, the status information sending means 13, the session joining means 14, the reaction data receiving means 15, and the reaction data sending means 16.

The connected user storage area contains data on users of user terminals 30 currently connected to the server apparatus 10. Specifically, it contains data of connected users' user IDs, user names, user characters, strings, and friend IDs. A user ID is data for identifying a user, and a user name can be set arbitrarily by a user. A user name is displayed on the user's own user terminal 30 and another user's user terminal 30.

A user character is data representing the appearance of a character used for game play by a user, and may be three-dimensional or two-dimensional data. A user can arrange a user character by choosing the user character's gender, features, hair style, outfit, shoes, and the like.

A string is set by a connected user. In the example shown in FIG. 3, a string "Akazukin" (Little Red Riding Hood) is stored in association with a user ID "U0001." There is no limitation on the font that can be used for a string, and the fonts provided in each user terminal 30 can be used. For example, Japanese, American, European, Simplified character, Traditional character, and Hangul fonts can be used. The length of a string is not also specifically limited, and can be set as appropriate depending on the operation.

A friend ID is a user ID of another user registered as a friend by a user. Another user's user ID may be stored as a friend ID by a user performing an operation to designate and register the other user as a friend, or another user's user ID may be stored as a friend ID only after a user receives approval to be a friend from the other user designated as a friend by the user.

While FIG. 3 illustrates the example in which user names, user characters, strings, and friend IDs are stored in the connected user storage area in association with connected users' user IDs, there may be a configuration in which user names, user characters, and friend IDs are stored in a not shown user information storage area and only connected users' user IDs and strings are stored in the connected user storage area. Strings may also be stored in the not shown user information storage area.

The status information storage area contains status information indicating the status of the application of each user. The user terminals 30 composing the information processing system 1 can send and receive status information among themselves via the server apparatus 10, and the server apparatus 10 stores status information received from the user terminals 30 in the status information storage area. User IDs, times of receiving status information, and the types and contents of status information are stored in the status information storage area in association with strings. Status information indicating the status of the application include "session participation information" such as information that a user has held and joined a session and information that a user has joined a session held by another user, and "status update information" for status updates.

Session participation information, which is one type of status information, will be described. A user can play a game together with another user. A group for playing a game together with another user is herein referred to as a "session." There are various types of sessions including, for example, a session for a user to be grouped with another user and take on a task (group session), a session for a user to play against another user (match session), and a session for a user to team up with another user and play as a team against another team (team match session).

Methods for a user to join a session include, but are not limited to, (1) holding and joining a session on the user's own, (2) joining a session held by another user, and (3) users requesting to join an arbitrary session and the server apparatus 10 randomly choosing a user and allowing the user to join.

Status update information will be described next. A user can update another user on the progress of a game as the status of the application. The progress of a game here refers to, for example, an increase in the user's game level or the acquisition of a new game item. Upon receiving such a status update, the other user can react to the status update. This allows the user to feel connected with the other user and enjoy the game.

Figure 4:
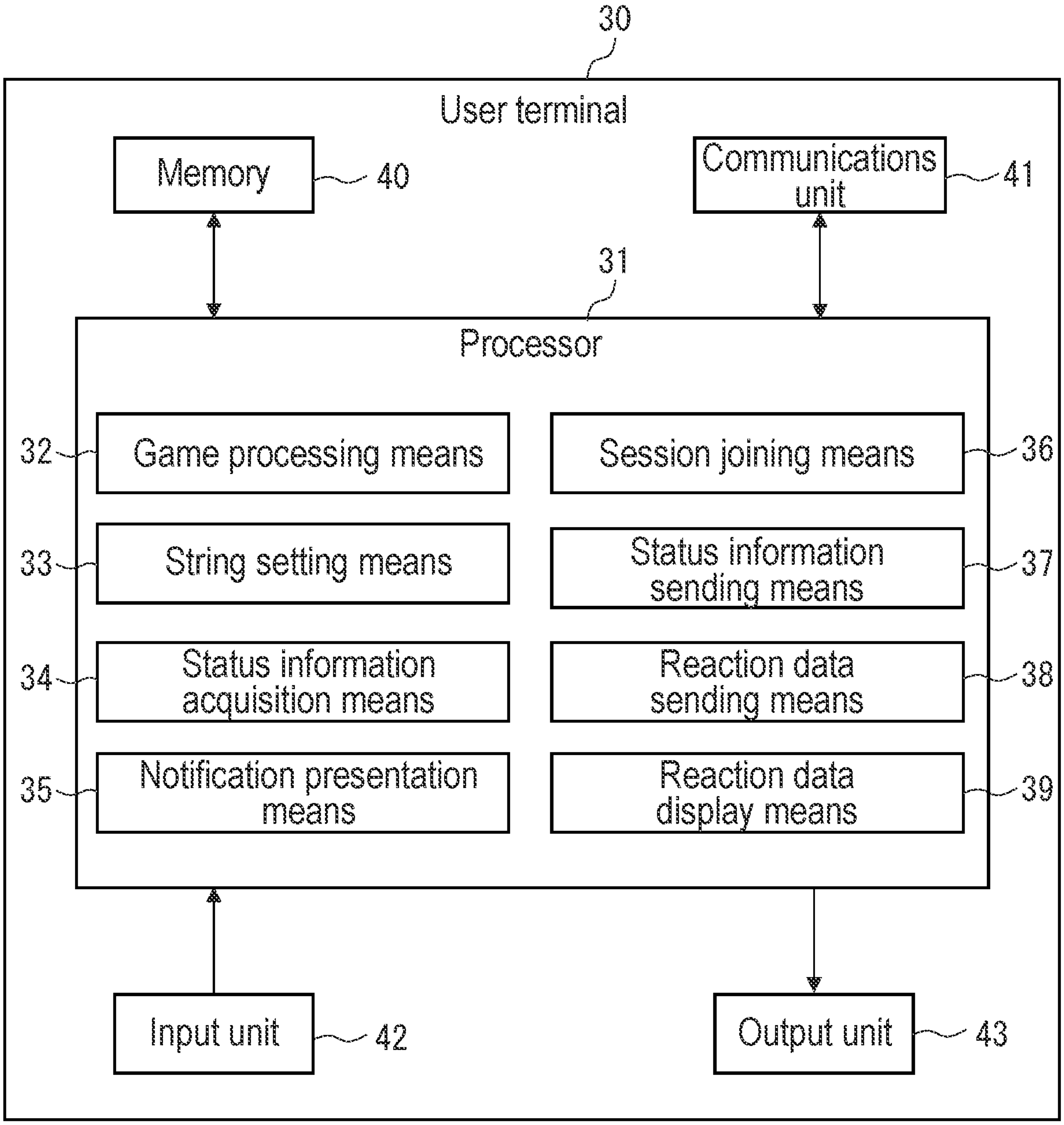
FIG. 4 shows a configuration of a user terminal of the first embodiment.

FIG. 4 shows a configuration of each user terminal 30. Each user terminal 30 has a processor 31, a memory 40, a communications unit 41, an input unit 42, and an output unit 43. The processor 31 reads and executes a user-terminal-side program stored in the memory 40, thereby realizing each function of game processing means 32, string setting means 33, status information acquisition means 34, notification presentation means 35, session joining means 36, status information sending means 37, reaction data sending means 38, and reaction data display means 39. Each function realized by the processor 31 will be described in a description of the operation of the information processing system 1.

The communications unit 41 has a function to communicate with the server apparatus 10 and other user terminals 30. The input unit 42 is configured to have a function to accept data input and comprises, for example, various keys, buttons, a touch-panel display, or the like. The output unit 43 is configured to have a function to output data and is, for example, a display.

FIG. 5 is a memory map showing an example of various data stored in the memory 40 of each user terminal 30. The memory 40 of each user terminal 30 has a program storage area, a string storage area, and a status information storage area. The memory 40 of each user terminal 30 also has areas other than the areas illustrated in FIG. 5.

The program storage area contains the user-terminal-side program for causing each user terminal 30 to function. The user-terminal-side program realizes the game processing means 32, the string setting means 33, the status information acquisition means 34, the notification presentation means 35, the session joining means 36, the status information sending means 37, the reaction data sending means 38, and the reaction data display means 39.

The string storage area contains data of a string set by each user. The string storage area can contain data of a plurality of strings. The string storage area also contains data for specifying one of the strings. In the example shown in FIG. 5, a string "Akazukin" is specified out of the strings "Akazukin," "Shirayuki hime" (Snow White), and "Usagi to Kame" (Rabbit and Tortoise).

The reason the string storage area is allowed to contain a plurality of pieces of string data is to facilitate the user's changing the string. If data of strings is stored in advance, a string can be chosen from the stored strings. The number of strings that can be specified is one in the embodiment, and this can reduce the number of notifications received by each user terminal 30 and can control network traffic. There may be a variation, however, where a plurality of strings can be specified.

Setting of a string to be stored in the string storage area will be described here. By the processor 31 executing the user-terminal-side program, the string setting means 33 of each user terminal 30 displays a string setting screen on a display of each user terminal 30, and uses the setting screen to encourage each user to input a string or specify one of strings that have been input. The string setting means 33 accepts data of a string input or specified by each user. The input or specification of a string may be accepted by means of a software keyboard displayed on a touch-panel display provided on each user terminal 30, or by means of a physical keyboard connected to each user terminal 30. The string setting means 33 stores an input string or information on the specification of a string in the string storage area.

The status information storage area contains other users' status information acquired via the server apparatus 10 from other user terminals 30. The status information is rewritten each time a new piece of status information is acquired from the server apparatus 10. The status information storage area contains the status information's source users' user IDs, user names, data indicating the types of the status information, and data on the contents of the status information. An upper limit may be set to the number of pieces of status information stored in the status information storage area. For example, the number of pieces of status information stored in the status information storage area may be limited to 50.

The type of status information is data indicating the type such as group session, match session, team match session, and status update. The contents of status information are data on the specific contents of a session or a status update.

An operation of the information processing system 1 will be described next. The following description is given of an operation for each user terminal 30 to start the application and establish a network connection to the server apparatus 10 (FIG. 6), and an operation to exchange status information among user terminals 30. An example in which status information is session participation information (FIGS. 7 and 8) and an example in which status information is status update information (FIGS. 9 and 10) are cited with regard to the operation to exchange status information.

Figure 6:
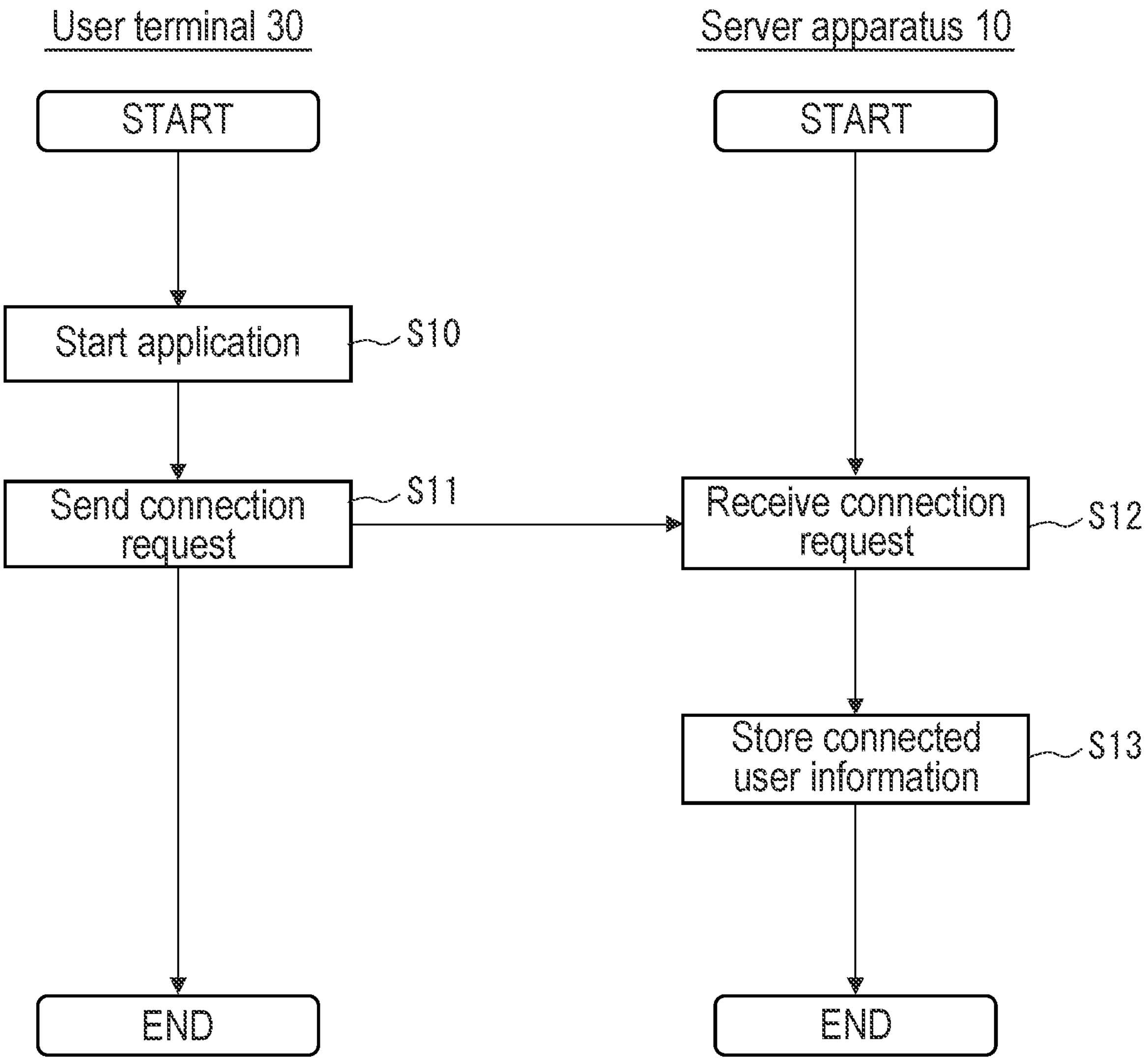
FIG. 6 is a flowchart showing an operation of an application at its start in the information processing system of the first embodiment.

FIG. 6 is a flowchart showing an operation of the application at its start. When a user terminal 30 starts the application (S10), the user terminal 30 sends a connection request to the server apparatus 10 (S11). The connection request sent by the user terminal 30 includes a user ID identifying the user of the user terminal 30 and string data. The user terminal 30 reads string data stored in the string storage area of the memory 40, and includes the read string data in connection request. Upon receiving the connection request from the user terminal 30 (S12), the server apparatus 10 stores the received information on the user of the user terminal 30 in the connected user storage area of the memory 20 (S13).

Figure 7:
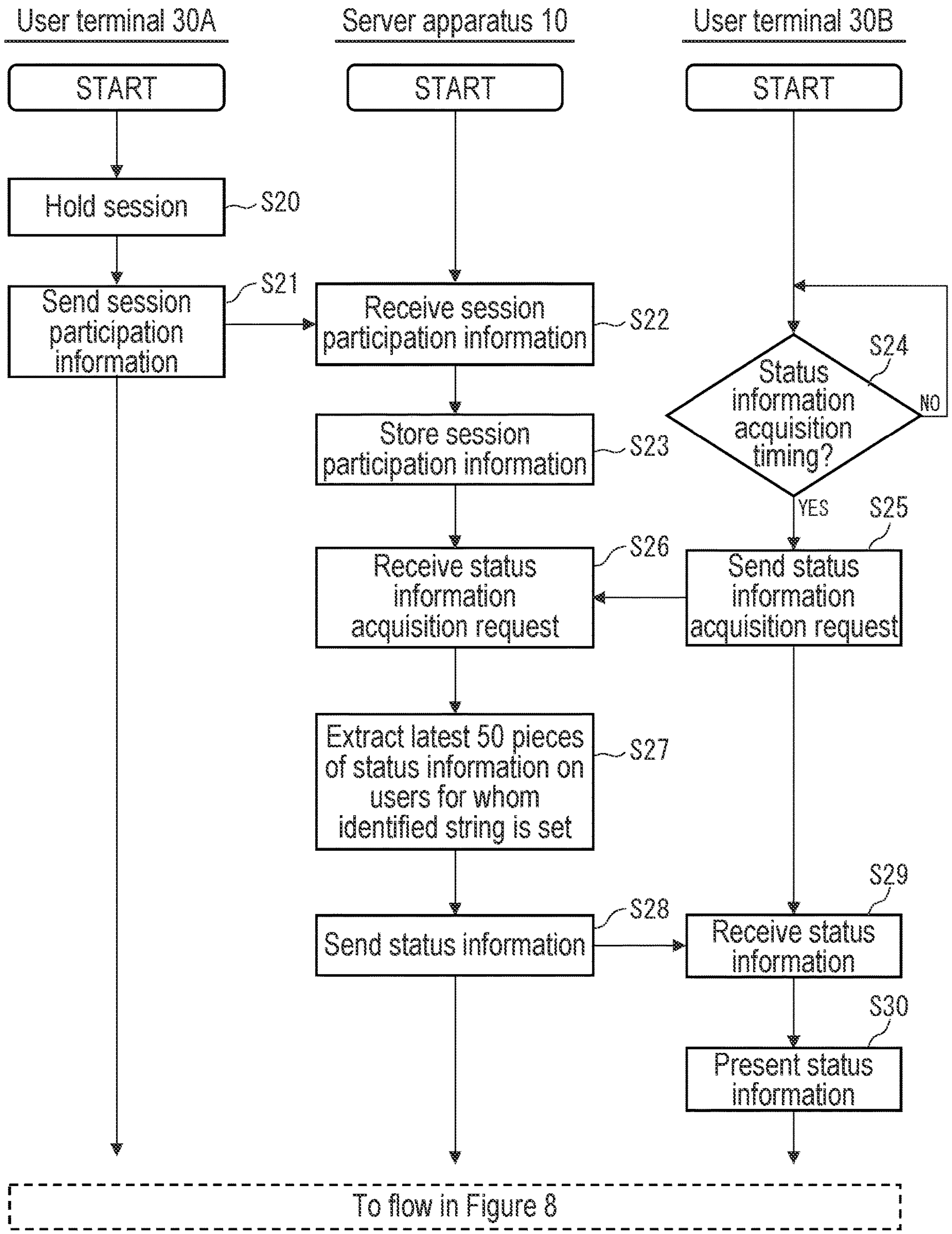
FIG. 7 is a flowchart showing an example of sending session participation information as status information by means of the information processing system of the first embodiment.
Figure 8:
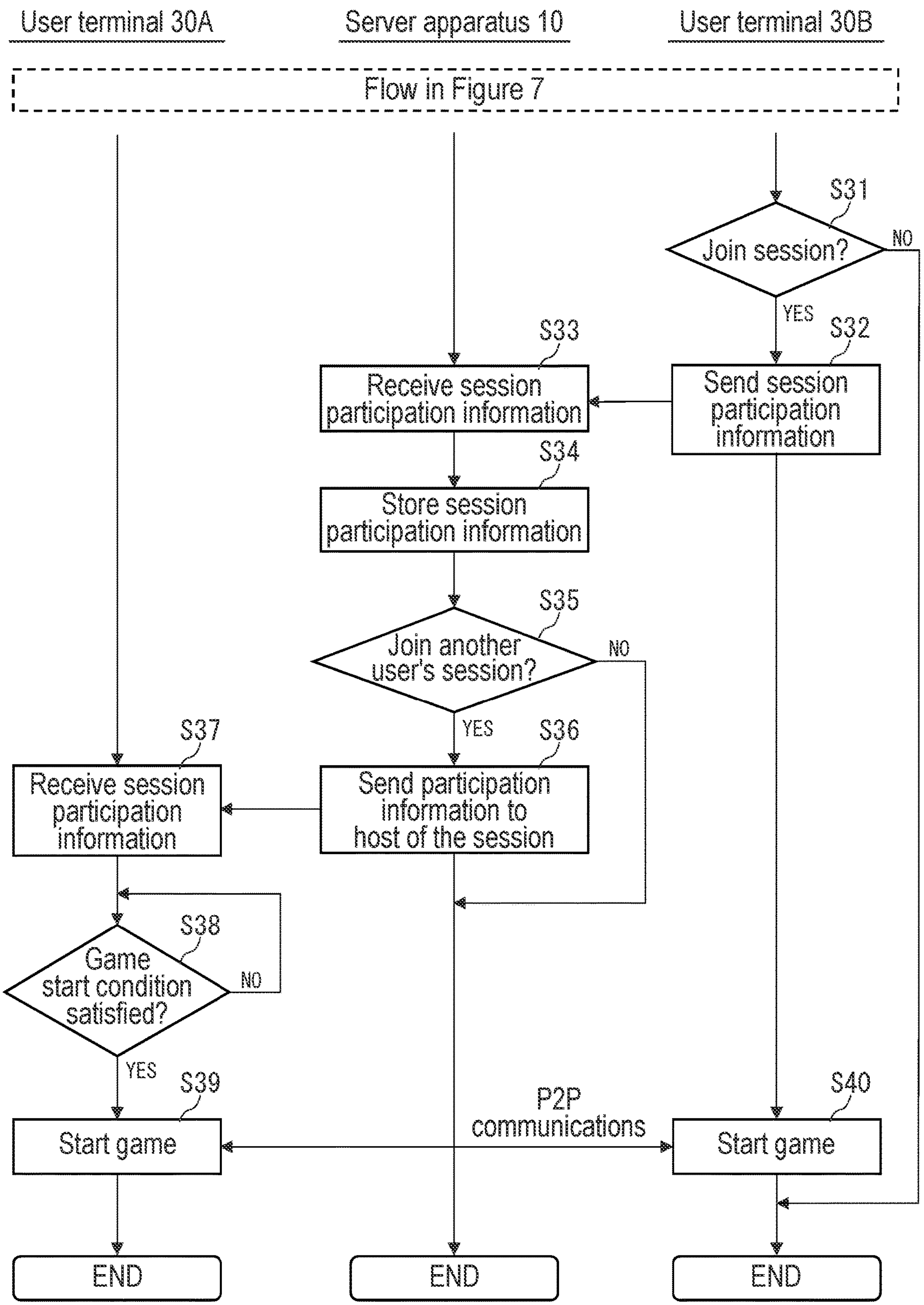
FIG. 8 is a flowchart showing an example of allowing a user to join a session by means of the information processing system of the first embodiment.

FIGS. 7 and 8 are flowcharts showing an example of an operation to send session participation information as status information. Designations "user terminal 30A" and "user terminal 30B" are used in FIGS. 7 and 8 for convenience of description in order to distinguish between two user terminals 30, but both of them are user terminals 30 that have the configuration shown in FIGS. 4 and 5.

As shown in FIG. 7, a user of the user terminal 30A first operates to hold a session (S20). Holding a session is to create a new session for playing with other users and join the session as the first participant. The user of the user terminal 30A is the host of the session the user has held.

The status information sending means 37 of the user terminal 30A sends session participation information as status information to the server apparatus 10 (S21). Upon receiving the session participation information sent from the user terminal 30A (S22), the status information receiving means 12 of the server apparatus 10 stores the received session participation information in the status information storage area of the memory 20 (S23). At this time, the status information receiving means 12 reads, from the connected user storage area, data on a string associated with the user ID of the source user of the status information, and stores the session participation information in the status information storage area in association with the read string. This allows for recognizing the string that identifies the destination of the session participation information received from the user terminal 30A.

Status information is also sent from another user terminal 30 not shown in the figures to the server apparatus 10 in the same manner as above, and pieces of status information received from a plurality of user terminals 30 are accumulated over time as shown in FIG. 3. The server apparatus 10 may delete status information from the status information storage area based on a specified condition. The specified condition is, for example, that a specified time has passed since the reception time of the status information or, if the status information is session participation information, that the participation in the session is closed or that the sending of the status information to user terminals to which the status information is to be sent has been completed.

A process of the user terminal 30B acquiring status information will be described next. The status information acquisition means 34 of the user terminal 30B determines whether the time has come for the acquisition of status information in the running application or not (S24).

The status information acquisition timing is the timing when, for example, a new piece of status information is required in order to display status information or update the display of status information. An example will be cited here. A room for presenting other users' status information is prepared first. This room corresponds to a "specified scene" in the running application. When a user's character enters the room, that is, when another scene has transitioned to the specified scene is the status information acquisition timing. There may be various other status information acquisition timings, which will be described later.

If the status information acquisition means 34 determines that the time has come for status information acquisition (YES at S24), a status information acquisition request is sent from the user terminal 30B to the server apparatus 10 (S25). Upon receiving the status information acquisition request sent from the user terminal 30B (S26), the server apparatus 10 by means of the status information sending means 13 extracts status information to be sent to the user terminal 30B (S27). Specifically, the status information sending means 13 refers to data stored in the connected user storage area of the memory 20 and identifies a string set by a user of the source (user terminal 30B) of the status information acquisition request. The string is identified by using information stored in the memory 20 here, but data of the string set by the user terminal 30B may be included in the status information acquisition request.

The status information sending means 13 then extracts from the status information storage area a specified number (50, for example here) of pieces of status information on users for whom the same string as the identified one is set, including the shown status information sent from the user terminal 30A.

At this time, the status information sending means 13 of the server apparatus 10 extracts status information in order of newest first. The status information sending means 13 of the server apparatus 10 may be configured to extract status information in the order from newest to the time when the user terminal 30B started connection and not to extract status information before the time when the user terminal 30B started connection. This allows for supporting connections between users who are connected to the Internet.

The server apparatus 10 sends the status information extracted by the status information sending means 13 to the source of the status information acquisition request, the user terminal 30B (S28). The status information acquisition means 34 of the user terminal 30B receives the status information sent from the server apparatus 10 (S29). The notification presentation means 35 of the user terminal 30B presents the status information on other users on a display of the user terminal 30B (S30).

FIG. 8 shows an operation to join a session in response to session participation information presented on the user terminal 30B. The specified number of pieces of status information are presented on the user terminal 30B, and the user of the user terminal 30B operates to join if the user is going to join one of the presented sessions. The operation to join a session is to specify a desired session out of the displayed pieces of status information and perform an operation to confirm the specification of the session (e.g., a button operation). The user terminal 30B by means of the session joining means 36 determines whether the operation to join a session has been performed or not (S31).

If the operation to join a session is determined to have been performed (YES at S31), the session joining means 36 of the user terminal 30B sends session participation information to the server apparatus 10 as status information (S32). Upon receiving the session participation information from the user terminal 30B (S33), the server apparatus 10 stores the received session participation information in the status information storage area of the memory 20 (S34).

Note that the session participation information to be stored here indicates that the user of the user terminal 30B joins as a guest the session held by the user of the user terminal 30A. The session participation information received at the step S22 in FIG. 7 indicates that the user of the user terminal 30A joins as a host the session held by the user of the user terminal 30A. Both of them are pieces of session participation information as status information, and are candidate data which the server apparatus 10 extracts and sends as status information upon a status information acquisition request from another user terminal 30.

The session joining means 14 of the server apparatus 10 determines whether the session participation information received from the user terminal 30B indicates that the user of the user terminal 30B joins a session held by another user or not, that is, whether the user joins as a guest or not (S35).

If it is determined that the user joins another user's session (YES at S35), the session joining means 14 of the server apparatus 10 sends the session participation information to the host of the session, the user terminal 30A (S36). The session joining means 14 also sends the session participation information of the user terminal 30B toward other user terminals 30 (not shown) that participate in the same session. The session participation information includes an address of the user terminal 30B that sent the session participation information. This allows for establishing P2P network connections between the user terminals 30 of the session participants and performing communications without passing through the server apparatus 10.

The user terminal 30A receives the session participation information of the user terminal 30B from the server apparatus 10 (S37). The session joining means 36 of the user terminal 30A determines whether a game start condition for the session is satisfied or not (S38). The game start condition is, for example, whether a required number of users for holding a game have gathered or not. If the game start condition is determined to be satisfied (YES at S38), game processing means 32 of the user terminal 30A starts a game with the user terminal 30B (S39 and S40). If the game is played among three or more user terminals 30, the game is started by communicating with a plurality of user terminals 30 including those not shown.

The game is performed by P2P communications between user terminals 30 that have joined the game. While in the embodiment an example is cited in which a game is performed via P2P communications between user terminals 30, a game may be carried out by communications among user terminals 30 via and under control of the server apparatus 10. How much the server apparatus 10 is engaged in communications among user terminals 30 can be determined as appropriate.

Figure 9:
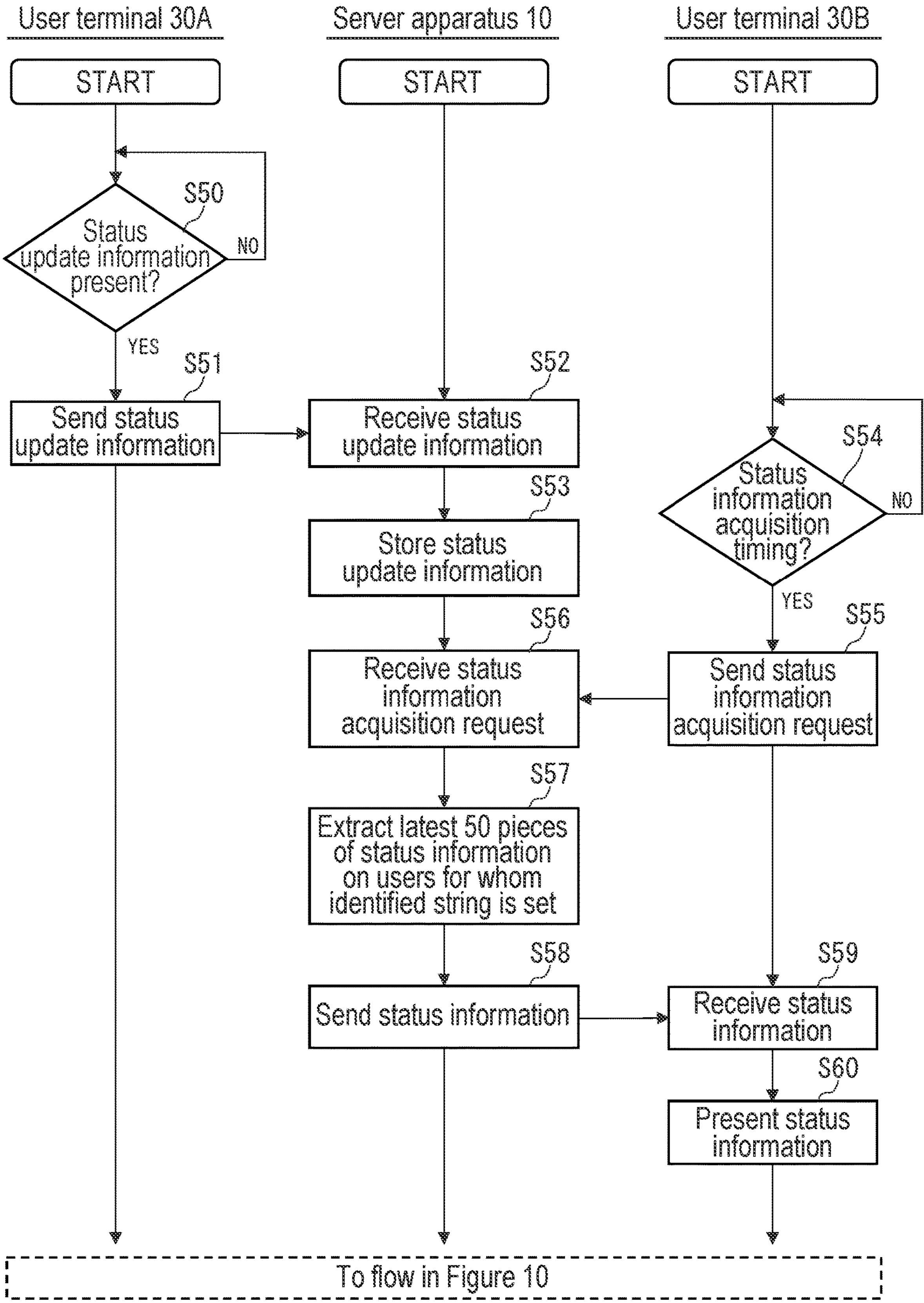
FIG. 9 is a flowchart showing an example of sending status update information as status information by means of the information processing system of the first embodiment.
Figure 10:
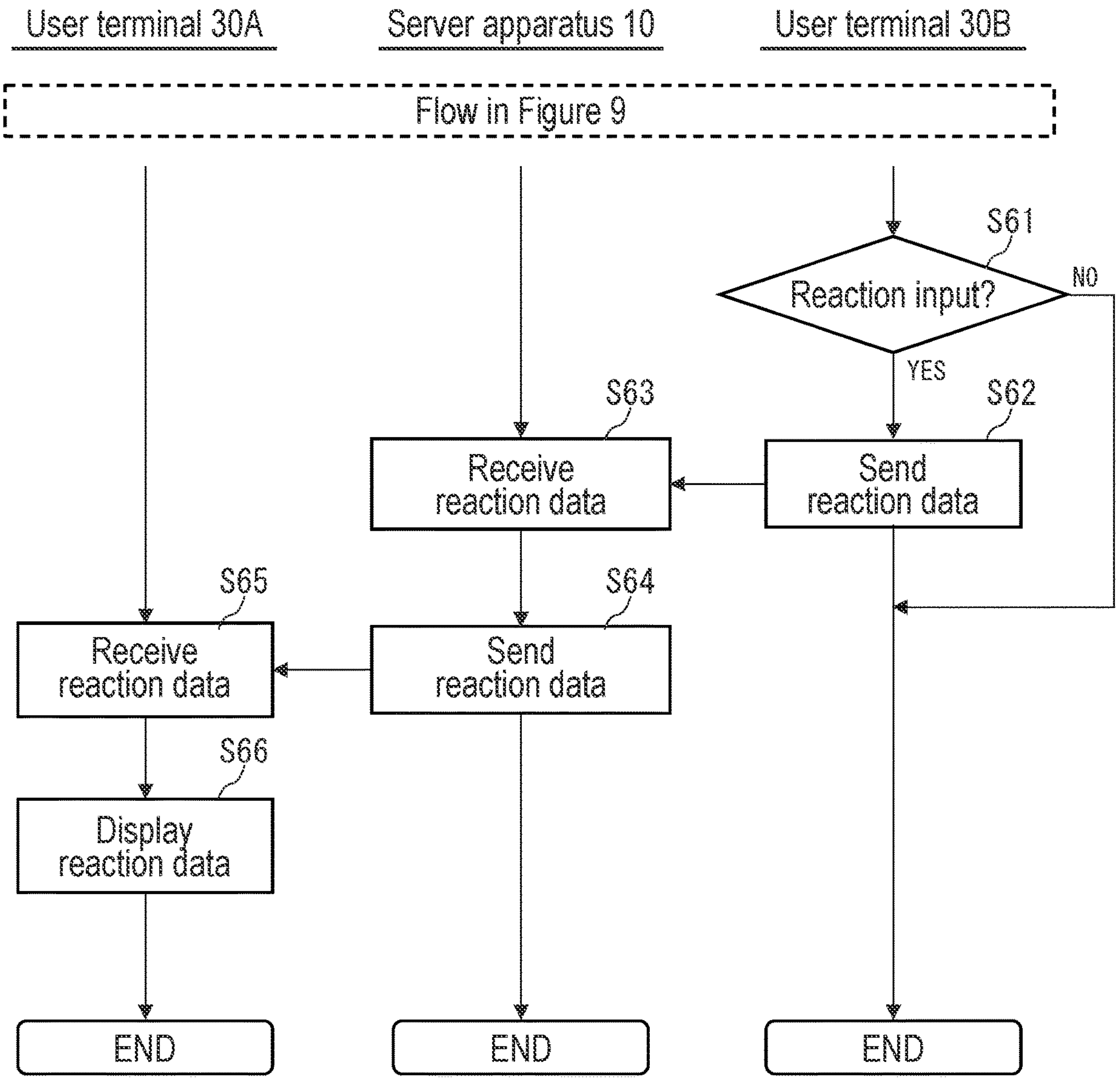
FIG. 10 is a flowchart showing an example of sending a reaction to the status update information by means of the information processing system of the first embodiment.

FIGS. 9 and 10 are flowcharts showing an operation to send status update information as status information. The status information sending means 13 of the user terminal 30A determines whether there is any status update information that should be reported as a status update or not (S50). That is, the user terminal 30A determines whether a specified condition on the progress of the application is satisfied or not, the specified condition being that there is any status update information.

Status update information here is information on the progress of a game and refers to, for example, an increase in the level or the acquisition of a new item. If it is determined that there is status update information (YES at S50), the status information sending means 37 of the user terminal 30A sends the status update information as status information to the server apparatus 10 (S51).

Upon receiving the status update information sent from the user terminal 30A (S52), the status information receiving means 12 of the server apparatus 10 stores the received status update information in the memory 20 (S53). At this time, the status information receiving means 12 reads data on a string associated with the user ID of the source user of the status information, and stores the status update information in the status information storage area in association with the read string. Status information is also sent from another user terminal 30 not shown in the figures to the server apparatus 10 in the same manner as above, and pieces of status information received from a plurality of user terminals 30 are accumulated over time as shown in FIG. 3.

Described next is an operation for the user terminal 30B to acquire status information, and this operation (S54 to S60) is the same as the operation described with FIG. 7 (S24 to S30). Since status update information is sent as status information in the flowchart shown in FIG. 9, status update information on other users is displayed on the user terminal 30B (S60).

FIG. 10 is a flowchart showing an operation of the information processing system 1 for when a reaction is given to the status update information on other users. The user of the user terminal 30B can input a reaction to the presented status update information. Reactions include, for example, "Nice!" and "Impressed!"

The reaction data sending means 38 of the user terminal 30B determines whether an operation to react to the status update information has been input or not (S61). If a reaction operation is determined to have been input (YES at S61), the reaction data sending means 38 of the user terminal 30B sends the input reaction data to the server apparatus 10 (S62). The reaction data receiving means 15 of the server apparatus 10 receives the reaction data from the user terminal 30B (S63). The reaction data sending means 16 of the server apparatus 10 sends the reaction data to the source of the status update information, the user terminal 30A, which is to be reacted (S64).

The user terminal 30A receives the reaction data from the server apparatus 10 (S65). The reaction data display means 39 of the user terminal 30A displays the reaction to the status update information (S66). At this time, it also displays information that identifies the source user of the reaction together.

As described above, status information is sent to and displayed on a user terminal 30 for which the same string is set in the information processing system 1 of the first embodiment, and therefore users for whom the same string is set can feel connected with one another while playing a game. A user only has to perform an operation to set a string in order to exchange status information. Sending and receiving status information between users for whom the same string is set allows a user to send and receive status information to and from another user who, for example, has similar likes and tastes or belongs to a community created in another social media platform. No administrator or the like is required for sending and receiving status information, and a user can start and stop sending and receiving status information whenever the user likes. That is, a user can casually interact with other users in a community in a game. In addition, if there is a community connected by a hashtag in another social media platform, a user can join the same community also in a game, using the same string as the hashtag.

While in the embodiment an example is described in which status information is exchanged among user terminals 30 of users for whom the same string is set, status information may be exchanged with friend users in addition to users for whom the same string is set, and the notification presentation means 35 may present status information on friend users in addition to status information on other users for whom the same string is set.

Second Embodiment

While in the above-described embodiment a mode is described in which the user terminal 30B on the side to receive status information pulls status information (the steps S24 and S25 in FIG. 7 and the steps S54 and S55 in FIG. 9), so-called push communication may be performed where status information is sent to the user terminal 30B connected to the Internet when the user terminal 30A sends the status information. In an information processing system of a second embodiment, the server apparatus 10 upon receiving status information from a user terminal 30 sends the status information to a plurality of user terminals 30 for which the same string set by the user of the source of the status information is set.

The configuration of the server apparatus used in the information processing system of the second embodiment is basically the same as the server apparatus 10 of the first embodiment (see FIG. 2). Data stored in the memory 20 of the server apparatus used in the second embodiment is, however, different from the server apparatus 10 of the first embodiment.

Figure 11:
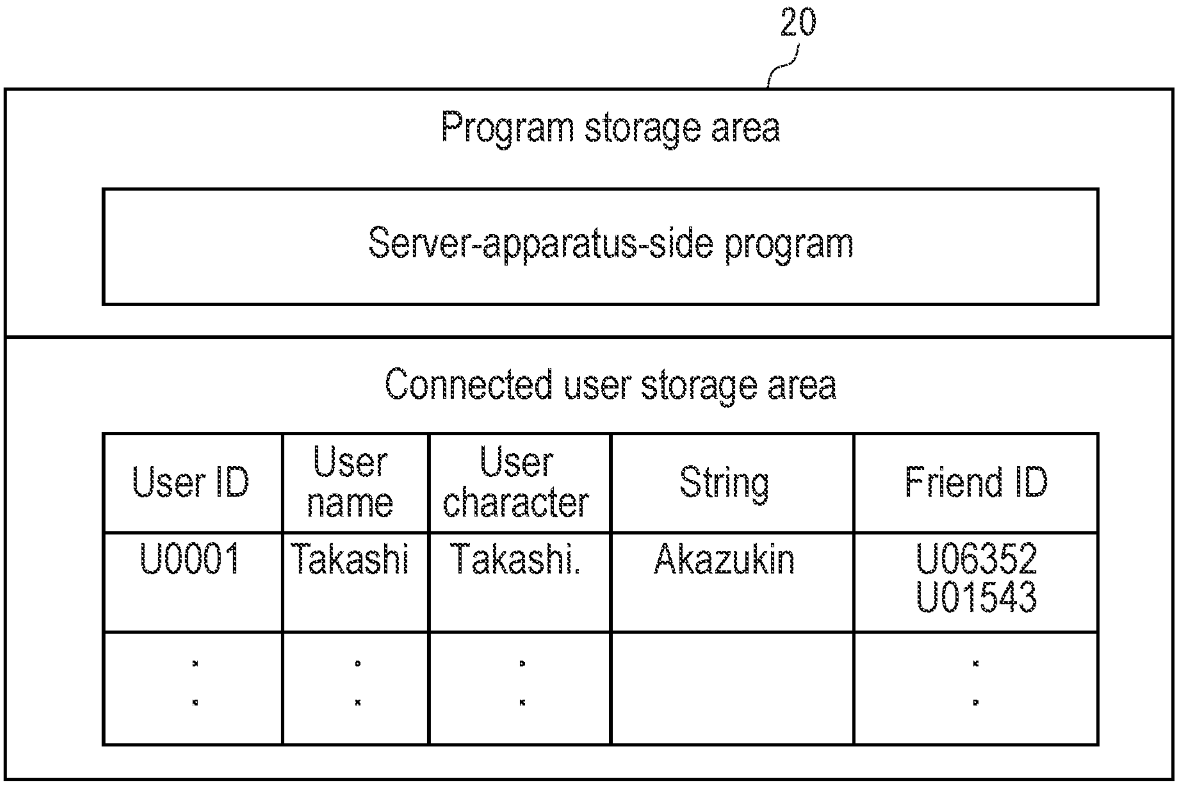
FIG. 11 shows an example of a memory map of the server apparatus of a second embodiment.

FIG. 11 is a memory map showing an example of various data stored in the memory 20 of the server apparatus 10 in the second embodiment. As shown in FIG. 11, the memory 20 of the server apparatus 10 has the program storage area and the connected user storage area. The memory 20 of the server apparatus 10 does not have the status information storage area since status information is not required to be accumulated in the memory 20 of the server apparatus 10 in the second embodiment.

The configuration of each user terminal 30 used in the information processing system of the second embodiment is basically the same as each user terminal 30 of the first embodiment (see FIG. 4). Data stored in the memory 40 of each user terminal 30 used in the second embodiment is, however, different from each user terminal 30 of the first embodiment.

FIG. 12 is a memory map showing an example of various data stored in the memory 40 of each user terminal 30 in the second embodiment. As shown in FIG. 12, the memory 40 of each user terminal 30 has the program storage area, the string storage area, and the status information storage area. The configurations of the program storage area and the string storage area are the same as the user terminals 30 of the first embodiment. The status information storage area contains data on the reception times of status information in addition to the status information's source users' user IDs, user names, data indicating the type of the status information, and data on the contents of the status information.

The status information acquisition means 34 of each user terminal 30 stores status information sent one after another from the server apparatus 10 in the status information storage area as it is sent. At this time, it stores data on the time of receiving status information from the server apparatus 10 in association with the status information.

Figure 13:
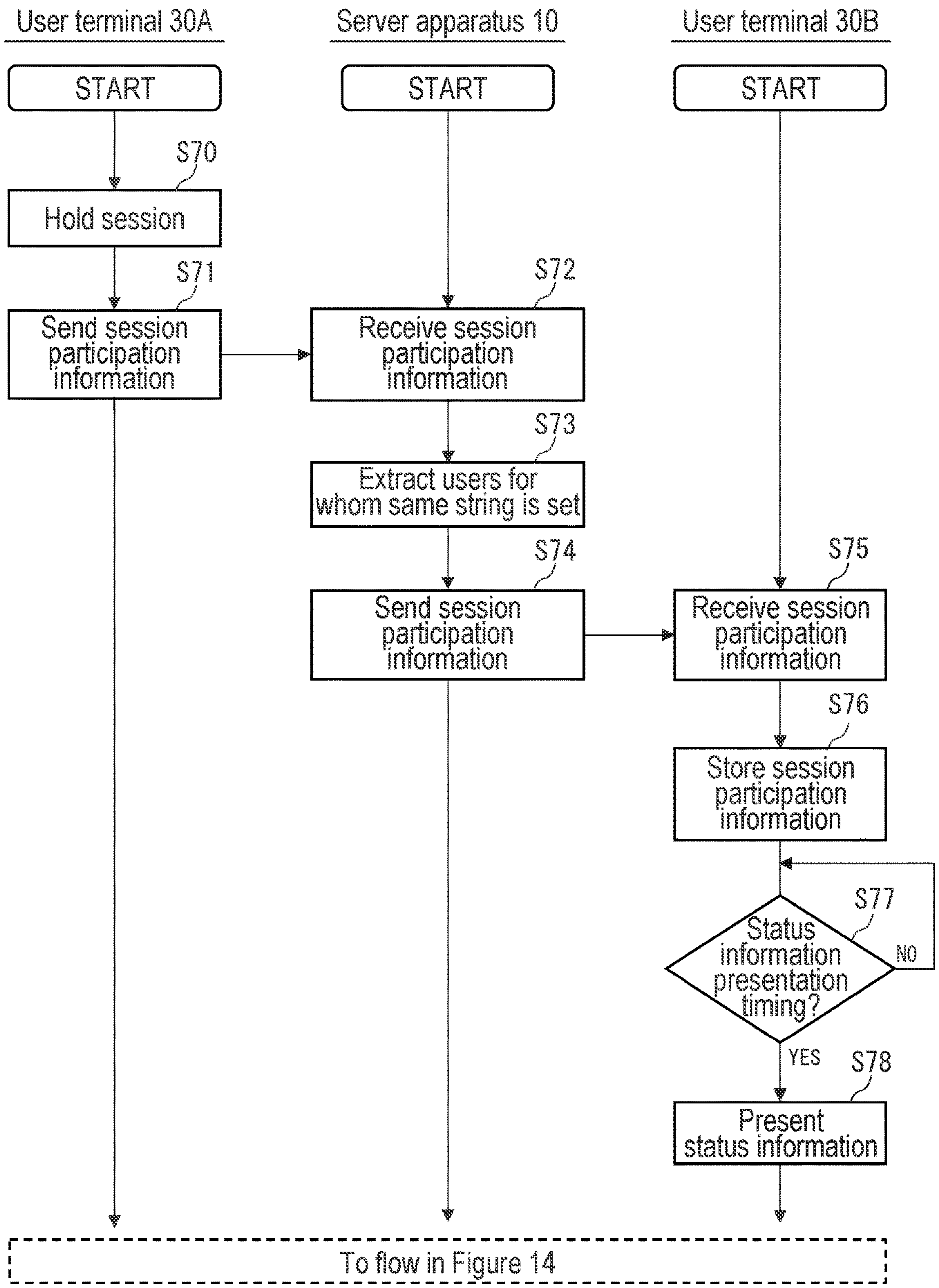
FIG. 13 is a flowchart showing an example of sending session participation information as status information by means of the information processing system of the second embodiment.

FIG. 13 is a flowchart showing an example of sending session participation information as status information by means of the information processing system of the second embodiment. While a case of sending session participation information as status information will be described here as an example, a case of sending status update information is basically the same.

A user of the user terminal 30A operates to hold a session (S70). The status information sending means 37 of the user terminal 30A sends session participation information as status information to the server apparatus 10 (S71). The status information receiving means 12 of the server apparatus 10 receives the session participation information sent from the user terminal 30A (S72). The status information sending means 13 of the server apparatus 10 randomly extracts from the connected user storage area a specified number of users for whom the same string set by the source user of the received session participation information is set (S73). The status information sending means 13 of the server apparatus 10 sends the session participation information to each extracted user's user terminal 30B (S74).

The status information acquisition means 34 of the user terminal 30B receives the session participation information sent from the server apparatus 10 (S75). The user terminal 30B stores the received session participation information in the status information storage area of the memory 40 (S76). In the embodiment, the timing of a user terminal 30 receiving status information is not necessarily the same as the timing of the user terminal 30 presenting the status information to a user using the user terminal 30. A user terminal 30 stores status information received from the server apparatus 10 in the memory 40, and reads the status information stored in the memory 40 to present it to the user when status information is to be presented or updated.

The notification presentation means 35 of the user terminal 30B determines whether the time has come for the presentation of status information in the running application or not (S77). The status information presentation timing may be the same as the status information acquisition timing in the first embodiment. If having determined that the time has come for the presentation of status information (YES at S77), the notification presentation means 35 of the user terminal 30B reads status information from the memory 40, and presents other users' session participation information on the display of the user terminal 30B (S78).

At this time, the notification presentation means 35 reads a specified number of pieces of status information in order of newest first. If status information is to be presented according to the scene where the user is present, the notification presentation means 35 reads only a specified number of pieces of status information of a type corresponding to the scene in order of newest first. It is acceptable not to read status information if its reception time does not satisfy a specified criterion. The specified criterion may be set by, for example, time such as within one hour from the current time, or clock time such as after the time at which the user started to execute the application.

Figure 14:
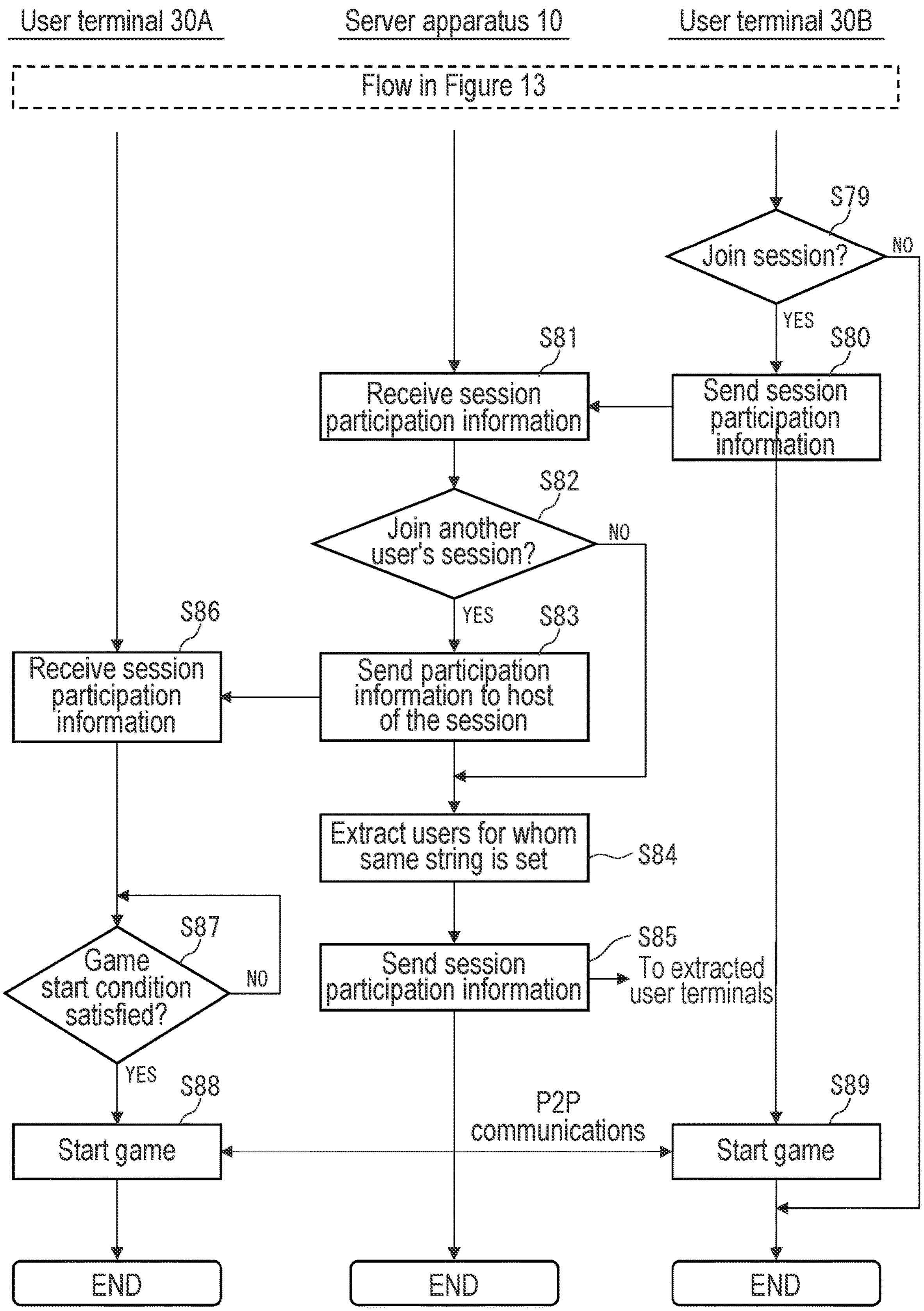
FIG. 14 is a flowchart showing an example of allowing a user to join a session by means of the information processing system of the second embodiment.

FIG. 14 shows an operation to join a session in response to session participation information presented on the user terminal 30B. The specified number of pieces of status information are presented on the user terminal 30B. The user of the user terminal 30B operates to join if the user is going to join one of the presented sessions. The operation to join a session is to specify a desired session out of the displayed pieces of status information and perform an operation to confirm the specification of the session (e.g., a button operation). The user terminal 30B by means of the session joining means 36 determines whether the operation to join a session has been performed or not (S79).

If the operation to join a session is determined to have been performed (YES at S79), the session joining means 36 of the user terminal 30B sends session participation information to the server apparatus 10 as status information (S80). Upon the server apparatus 10 receiving the session participation information from the user terminal 30B (S81), the session joining means 14 of the server apparatus 10 determines whether the session participation information received from the user terminal 30B indicates that the user of the user terminal 30B joins a session held by another user or not, that is, whether the user joins as a guest or not (S82).

If it is determined that the user joins another user's session (YES at S82), the session joining means 14 of the server apparatus 10 sends the session participation information of the user terminal 30B to the host of the session, the user terminal 30A (S83). The session participation information includes an address of the user terminal 30B that sent the session participation information. This allows for establishing P2P network connections between the user terminals 30 of the session participants and performing communications without passing through the server apparatus 10. The session joining means 14 also sends the session participation information toward other user terminals 30 (not shown) that participate in the same session.

The status information sending means 13 of the server apparatus 10 extracts a specified number of users for whom the same string set by the source user of the received session participation information is set (S84), and sends the session participation information to each extracted user's user terminal 30 (S85). This is the same as the steps S73 and S74 described with FIG. 13.

The user terminal 30A receives the session participation information of the user terminal 30B from the server apparatus 10 (S86). The session joining means 36 of the user terminal 30A determines whether a game start condition for the session is satisfied or not (S87). The game start condition is, for example, whether a required number of users for holding a game have gathered or not. If the game start condition is determined to be satisfied (YES at S87), game processing means 32 of the user terminal 30A starts a game with the user terminal 30B (S88 and S89). If the game is played among three or more user terminals 30, the game is started by communicating with a plurality of user terminals 30 including those not shown. The game is performed by P2P communications between user terminals 30 that have joined the session.

Third Embodiment

Next, an information processing system of a third embodiment will be described. The configuration of the information processing system of the third embodiment is basically the same as the information processing system 1 of the first embodiment. The information processing system of the third embodiment is different from the first embodiment in the modes of presenting status information on each user terminal 30. Each user terminal 30 of the third embodiment displays status information in two modes, which are a mode in which a character of another user is displayed and status information is presented to a user by the user approaching the other user character and a mode in which pieces of status information are displayed in a list and chosen status information is displayed.

Figure 15:
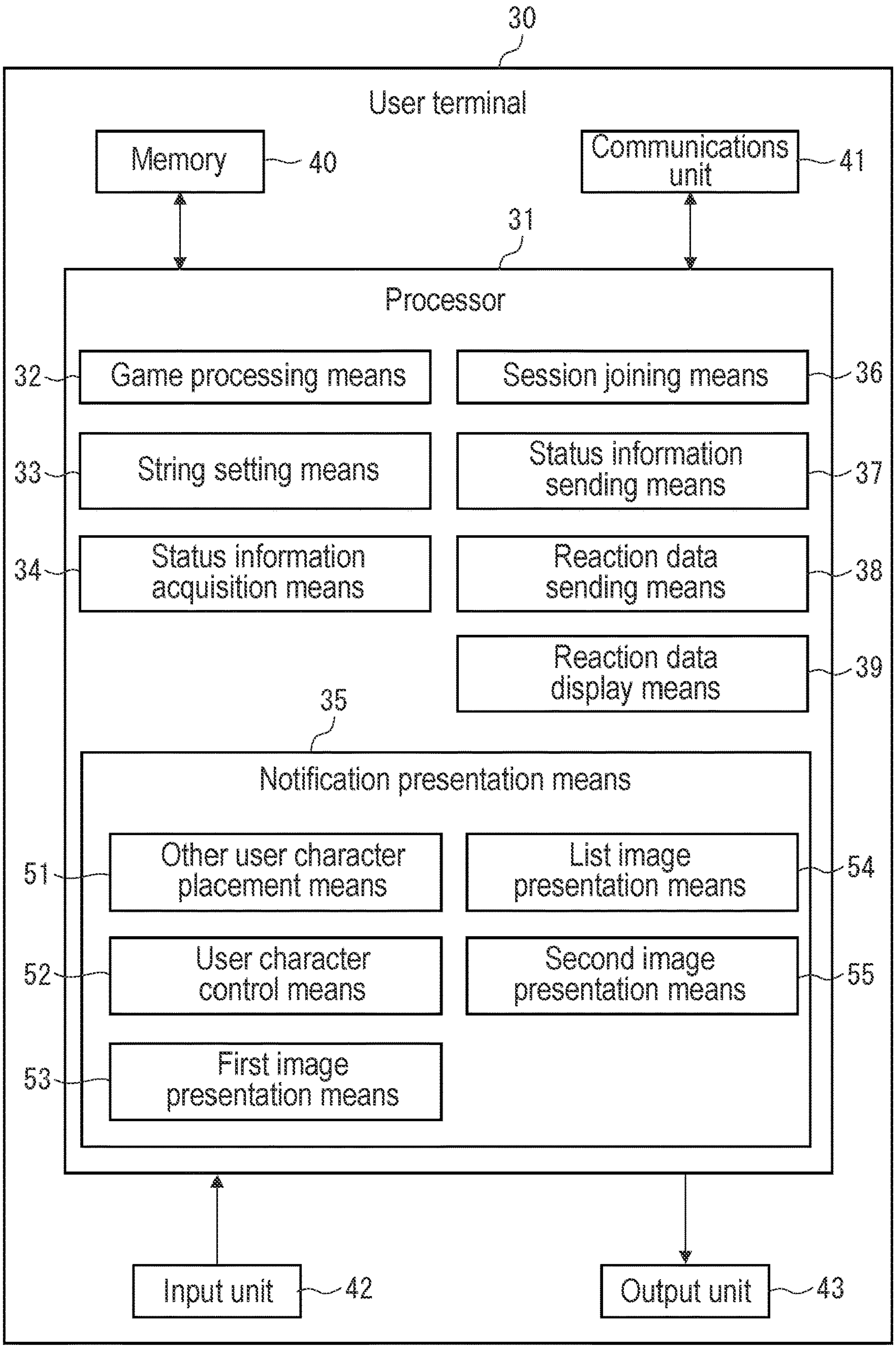
FIG. 15 shows a configuration of the user terminal of a third embodiment.

FIG. 15 shows a configuration of each user terminal 30 of the third embodiment. The notification presentation means 35 of each user terminal 30 of the third embodiment includes other user character placement means 51, user character control means 52, first image presentation means 53, list image presentation means 54, and second image presentation means 55.

FIG. 16 shows a memory map of each user terminal 30 of the third embodiment. The memory map of each user terminal 30 of the third embodiment is basically the same as the memory map of each user terminal 30 of the first embodiment, but is different therefrom in that the status information storage area contains user character data of other users.

User character data is not included in all status information received from the server apparatus 10, but is included in some status information. Status information including user character data is presented by using another user's character.

In the example shown in FIG. 16, user IDs "U0378" and "U0258" each include user character data, but a user ID "U0647" does not. If the total number of pieces of status information to be stored in the status information storage area is 50, a user character is included in each of, for example, seven pieces of status information.

Which status information to include user character data in is determined by the server apparatus 10. For example, user character data may be included in the latest seven pieces of status information, or in the latest seven pieces of status information of a specified type (e.g., match session). User character data may also be included only in status information of a specified type (e.g., match session). In addition, which status information to present via a user character may be determined based on the scene where a character of a user is present. For example, in a scene where a user is in a room for a match session, status information is presented about the match session via a user character, and status information other than that is displayed in a list.

Figure 17:
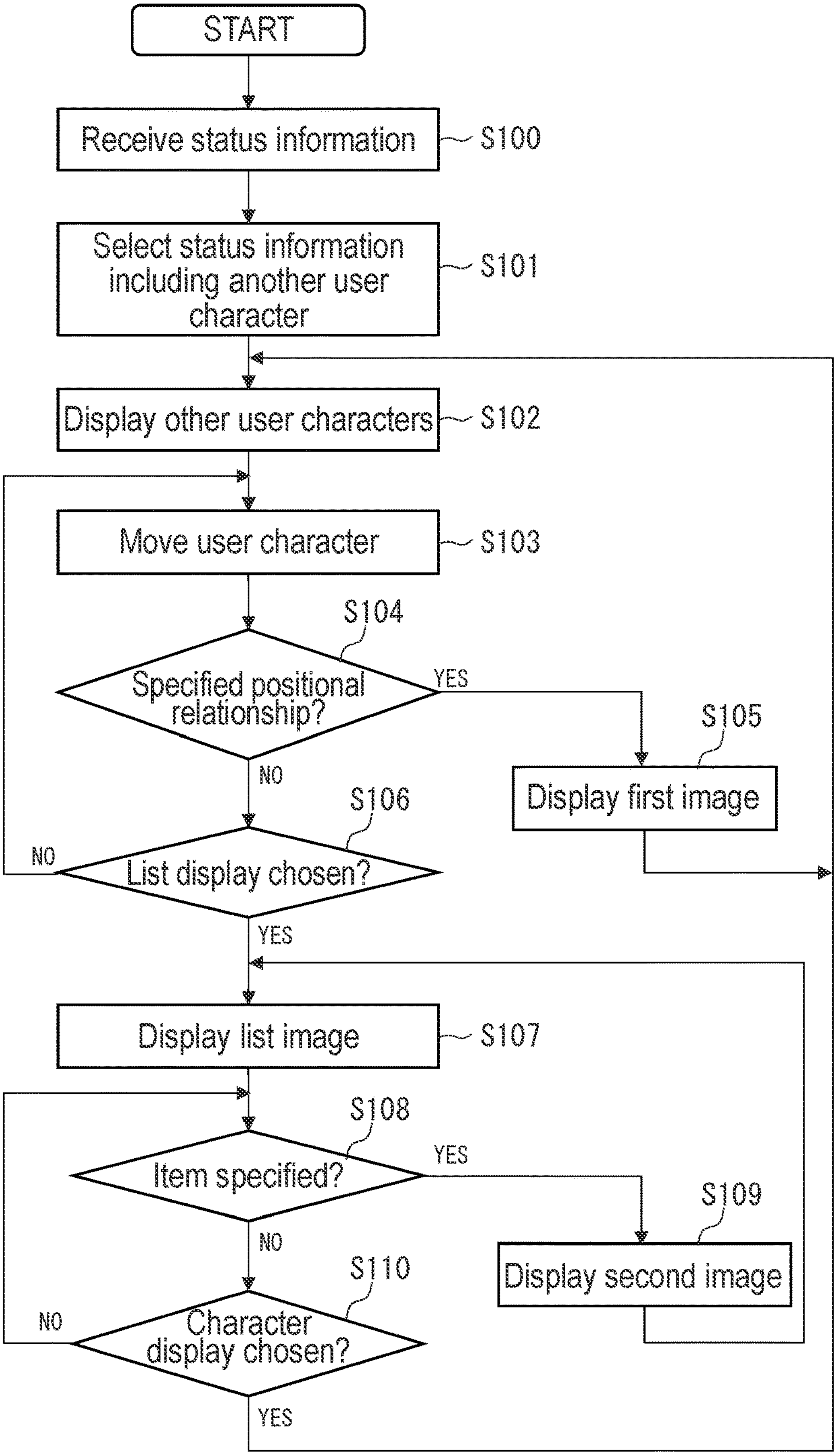
FIG. 17 is a flowchart showing an example of presenting status information by means of the user terminal of the third embodiment.

FIG. 17 is a flowchart showing a process of presenting status information by means of each user terminal 30 of the third embodiment. The process shown in FIG. 17 corresponds to the details of the status information presentation steps S30 in FIG. 7, S60 in FIG. 9, and S78 in FIG. 13.

Upon a user terminal 30 receiving status information from the server apparatus 10 (S100), the other user character placement means 51 selects pieces of status information having user character data from among the status information (S101), and displays those other user characters in a virtual space (S102).

Figure 18:
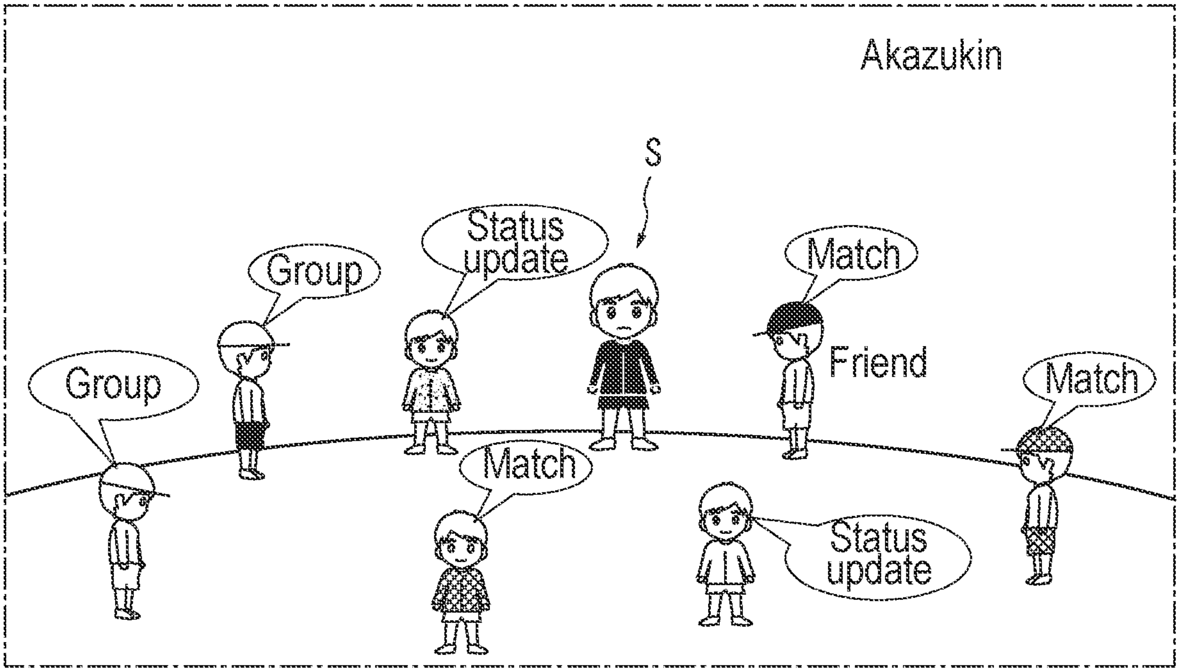
FIG. 18 shows an example of a screen for status information presented by the user terminal of the third embodiment.

FIG. 18 shows an example of the screen on which other user characters are placed in the virtual space. The virtual space in the example shown in FIG. 18 is made to look like a lobby, and the user's own character S and seven other user characters are placed in the virtual space. While the virtual space is made to look like a lobby here, the virtual space does not have to be a lobby and may be a space made to look like, for example, a stadium, a grassland, a desert, or space. The number of other user characters placed in the virtual space is made less than the total number of pieces of status information in order to maintain the visibility of the virtual space.

In the upper right of the screen is displayed a string set by the user, "Akazukin." The users of the other user characters placed on the screen shown in FIG. 18 have set their strings to "Akazukin." However one of the other user characters which is marked "Friend" in FIG. 18 is a character of a user having a friend relationship with the user. Status information is sent to and received from users having a friend relationship regardless of whether the same string is set or not. The other user characters do not move, and stay where they are placed. The other user characters do not reflect information on operations performed by the other users, and the other user characters displayed here can be called "avatars" in that sense. The presentation of status information through such "avatars" allows the user to feel the status of friends, acquaintances, and other people for whom the same string is set, with whom the user is not playing directly. This allows for creating an opportunity for playing online directly with other users. In addition, displaying status information in a form of "avatar" allows the status information to be seen more automatically in a game, increasing triggers to recognize notifications.

Each other user character is provided with a balloon, where information indicating the type of status information is displayed. This allows the user to recognize what kind of status information the other user characters have. While an example is cited here in which a balloon indicates the type of status information, the appearance of each other user character may be changed depending on the type of status information. For example, there may be a mode in which other user characters having session participation information are made to stand out by highlighting them more than other user characters having status update information.

The user character control means 52 of the user terminal 30 moves the user's character S in the virtual space in response to an operation input from the user (S103). It is determined whether the positional relationship between the user's character S and another user character has become a specified positional relationship as a result of the movement of the user's character S or not (S104). The specified positional relationship here means that, for example, the distance between the user character S and another user character in the virtual space is equal to or less than a specified threshold.

If the positional relationship between the user's character S and another user character has become the specified positional relationship (YES at S104), the first image presentation means 53 of the user terminal 30 displays status information acquired from the user of the other user character as a first image (S105).

Figure 20:
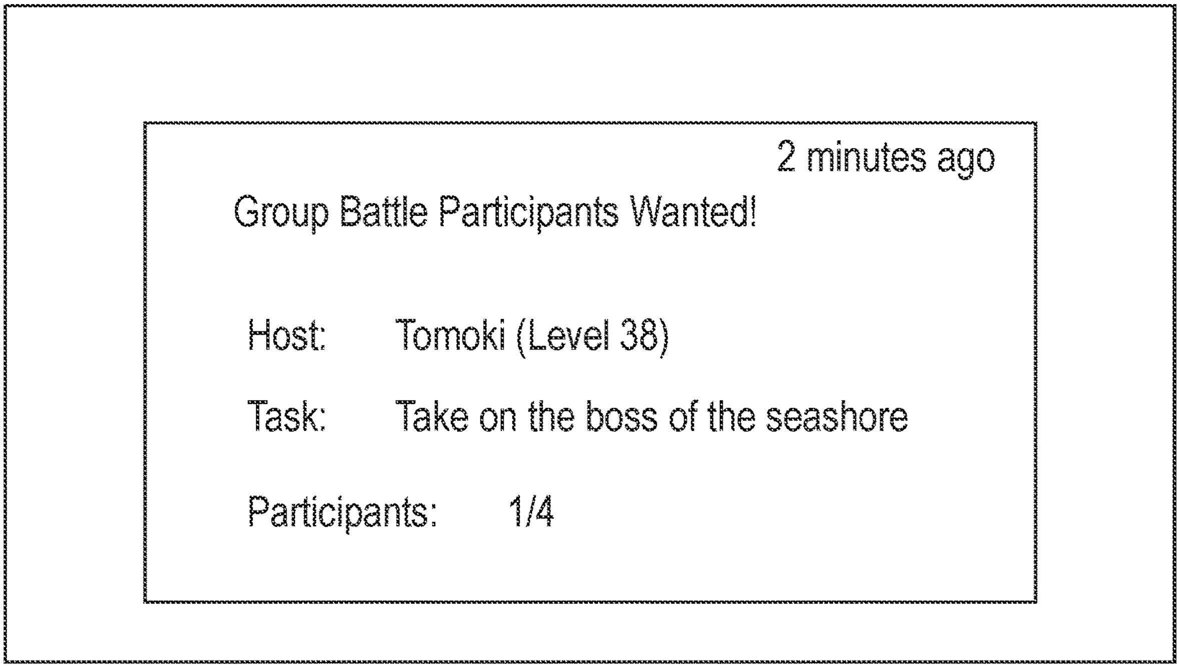
FIG. 20 shows an example of a first image and a second image for presenting status information.

FIG. 20 shows an example of the first image. Detailed information of session participation information is displayed in the first image. In the upper right of the first image is displayed "2 minutes ago," which indicates the time when the session participation information was generated. The title saying "Group Battle Participants Wanted!" indicates that the session participation information is for a group battle. "Host: Tomoki (Level 38)" is information on the user who has held the session, and "Task: Take on the boss of the seashore" indicates a task to be accomplished by the group. "Participants: ¼" indicates that the number of people required to start the session is four and one person (Tomoki) is in now. The first image may be displayed on a screen other than the image shown in FIG. 18, or may be displayed by being superimposed on the virtual space shown in FIG. 18.

While the first image is displayed when the positional relationship between the user's character S and another user character has become a specified positional relationship here, the first image may be displayed when a selection operation is accepted from the user while the positional relationship between the user's character S and another user character is a specified positional relationship.

The presentation of status information through other user characters as above makes it easier for the user to notice status information on other users, and offers a feeling that the user character S works on another user character in the virtual space to acquire status information the other user has.

If the positional relationship between the user's character S and another user character does not become the specified positional relationship (NO at S104), it is determined whether the choice of displaying a list is input to the user terminal 30 or not (S106). If the choice of displaying a list is not input (NO at S106), the process returns to the step of accepting an operation to move the user character S (S103).

If the choice of displaying a list is input (YES at S106), the list image presentation means 54 of the user terminal 30 displays a list image for listing notifications about the status information (S107).

Figure 19:
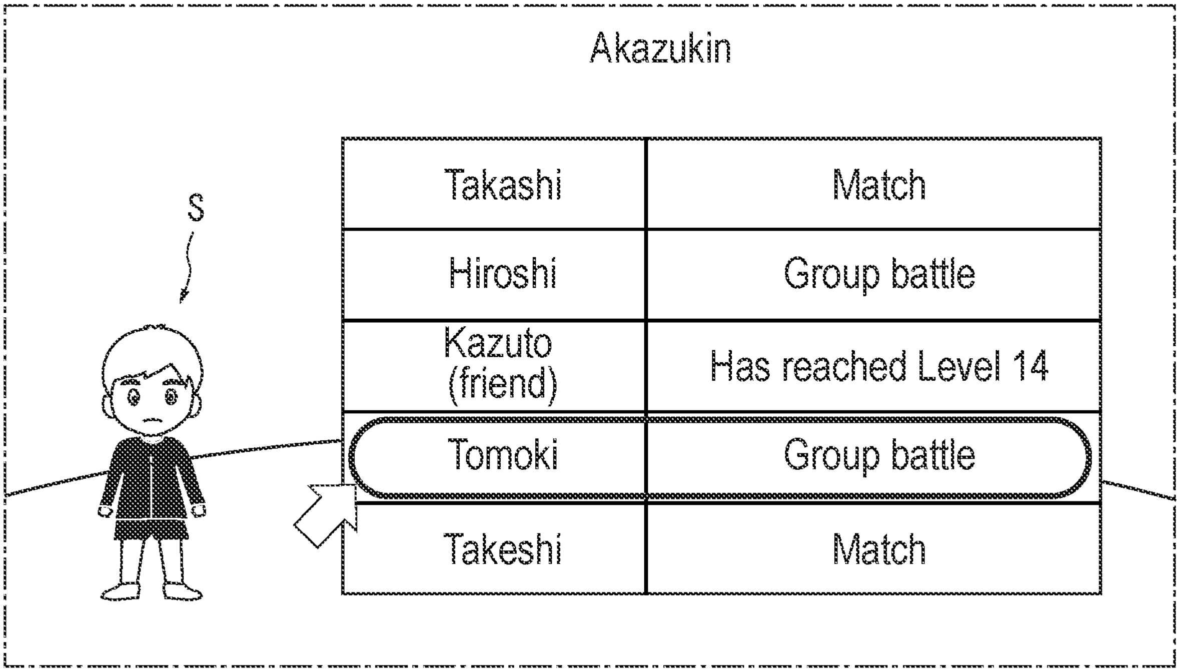
FIG. 19 shows an example of a screen for status information presented by the user terminal of the third embodiment.

FIG. 19 shows an example of a screen on which the list image is displayed. Similarly to the example shown in FIG. 18, the user character S is placed in a virtual space made to look like a lobby. In the upper right of the screen is displayed the string set by the user, "Akazukin." The user names placed on the list shown in FIG. 19 have set their strings to "Akazukin." However, "Kazuto" in FIG. 19 is a friend of the user, and status information can be sent to and received from friends regardless of whether the same string is set or not. Therefore, "Kazuto" may not set the string "Akazukin."

The list of the status information is displayed next to the user character S. The list shows the user names of the source users of the status information, and information on the types of the status information. Though status information on only five people is displayed in FIG. 19, the user's operation input enables the list to be scrolled and display other user's status information.

It is determined whether any item on the list is specified on this screen or not (S108). One of the items on the list is highlighted with a box and an arrow as shown in FIG. 19. "Tomoki, Group battle" is highlighted in the example shown in FIG. 19. An item on the list is specified if the user operates to confirm while highlighting it.

If an item on the list is specified (YES at S108), the second image presentation means 55 displays status information corresponding to the specified item as a second image (S109). The same image as the first image (see FIG. 20) is used as the second image in the embodiment. If no item on the list is specified (NO at S108), the notification presentation means 35 of the user terminal 30 determines whether the choice of displaying characters is input or not (S110).

If the choice of displaying characters is input (YES at S110), the notification presentation means 35 of the user terminal 30 returns to the step of the other user character placement means 51 displaying other user characters (S102). If the choice of displaying characters is not input (NO at S110), the notification presentation means 35 of the user terminal 30 returns to the step of determining whether an item on the list is specified or not (S108).

While in the embodiment the same image is used as the first and second images, the first image presented by the first image presentation means 53 and the second image presented by the second image presentation means 55 may appear different as long as they share the same content.

When the first image presented by the first image presentation means 53 is session participation information, the user terminal 30 sends session participation information to the server apparatus 10 upon accepting an operation to join the session. When the first image presented by the first image presentation means 53 is status update information, the user terminal 30 sends reaction data to the server apparatus 10 upon accepting an operation to react to the status update information.

Since the user terminal 30 of the information processing system 1 of the third embodiment places other user characters in a virtual space and works on another user character to acquire the other user's status information, status information can be acquired in a natural manner. Since there may also be a mode in which pieces of status information are displayed in a list, status information can be checked with the list if it is a bother to move the user character S.

While in the before-described embodiment a time when another scene has transitioned to the specified scene is illustrated as an example of the timing of the user terminal 30B acquiring status information, the timing of acquiring status information is not limited to the above example and there may be the following example.

At the step S106 where it is determined whether the choice of displaying a list is accepted or not, the user terminal 30 may accept the choice of displaying a list (YES at S106) and acquire new status information when presenting the list. New status information may also be acquired at the status information acquisition timing being when a specified time has passed since a list image was presented.

When a plurality of users simultaneously request to join a session or in similar cases, some may not be able to join the session because the capacity limit has been exceeded. New status information may also be acquired at the status information acquisition timing being when an attempt to join another person's session has failed.

While as described above the virtual space where other user characters are placed is a scene for presenting status information to the user, a game may be able to be practiced in this virtual space. For example, if the game involves competing by counting the number of destroyed target objects, a process may be performed that involves placing a target object in the virtual space, accepting an operation input to cause the user character to perform a specified action, and destroying the target object if the specified action is performed on the target object. This allows for destroying the target object in the virtual space where other user characters are placed, and therefore can offer a feeling of playing not alone. The user can wait a notification of status information such as session participation information from other users while practicing the game.

While in the embodiment an example is described in which user character data is included in some status information to be sent from the server apparatus 10 to the user terminal 30A, user character data may be included in all status information to be sent from the server apparatus 10 to the user terminal 30A. In this case, the other user character placement means 51 of the user terminal 30A determines which other user characters are placed based on the status information.

While in the embodiment an example is cited in which static other user characters (herein referred to as "notification characters") are displayed in the virtual space generated by the other user character placement means 51, live characters, on which operations of other user characters performed by other users participating in the same session are reflected, may be displayed in the virtual space. In this case, the other user character placement means does not place notification characters in the virtual space for users for whom it displays live characters. This prevents live and notification characters of the same user from coexisting.

While in the embodiment an example is described in which notifying status information by other user characters and a list is applied to the information processing system of the first embodiment, this mode of notifying status information can be applied to the information processing system of the second embodiment. If notifying status information by other user characters and a list is applied to the information processing system of the second embodiment, information on user characters is included for all status information in the status information storage area of the user terminal 30. This allows the user terminal 30 to determine status information to be presented through other user characters, based on the scene where the user is present or the like.

The configuration, described in the embodiment, in which status information is presented through other user characters and a list can be applied not only to status information received from user terminals 30 for which the same string is set. That is, the configuration does not necessarily assume a configuration in which status information is sent and received between user terminals 30 for which the same string is set, and can also be applied to, for example, an information processing system in which status information is sent and received only between friends or users registered in advance.

Fourth Embodiment

Next, an information processing system of a fourth embodiment will be described. The configuration of the information processing system of the fourth embodiment is basically the same as the information processing system 1 of the first embodiment, but in the information processing system of the fourth embodiment, friends can be recruited to join a session before users for whom the same string is set are recruited for a session.

Figure 21:
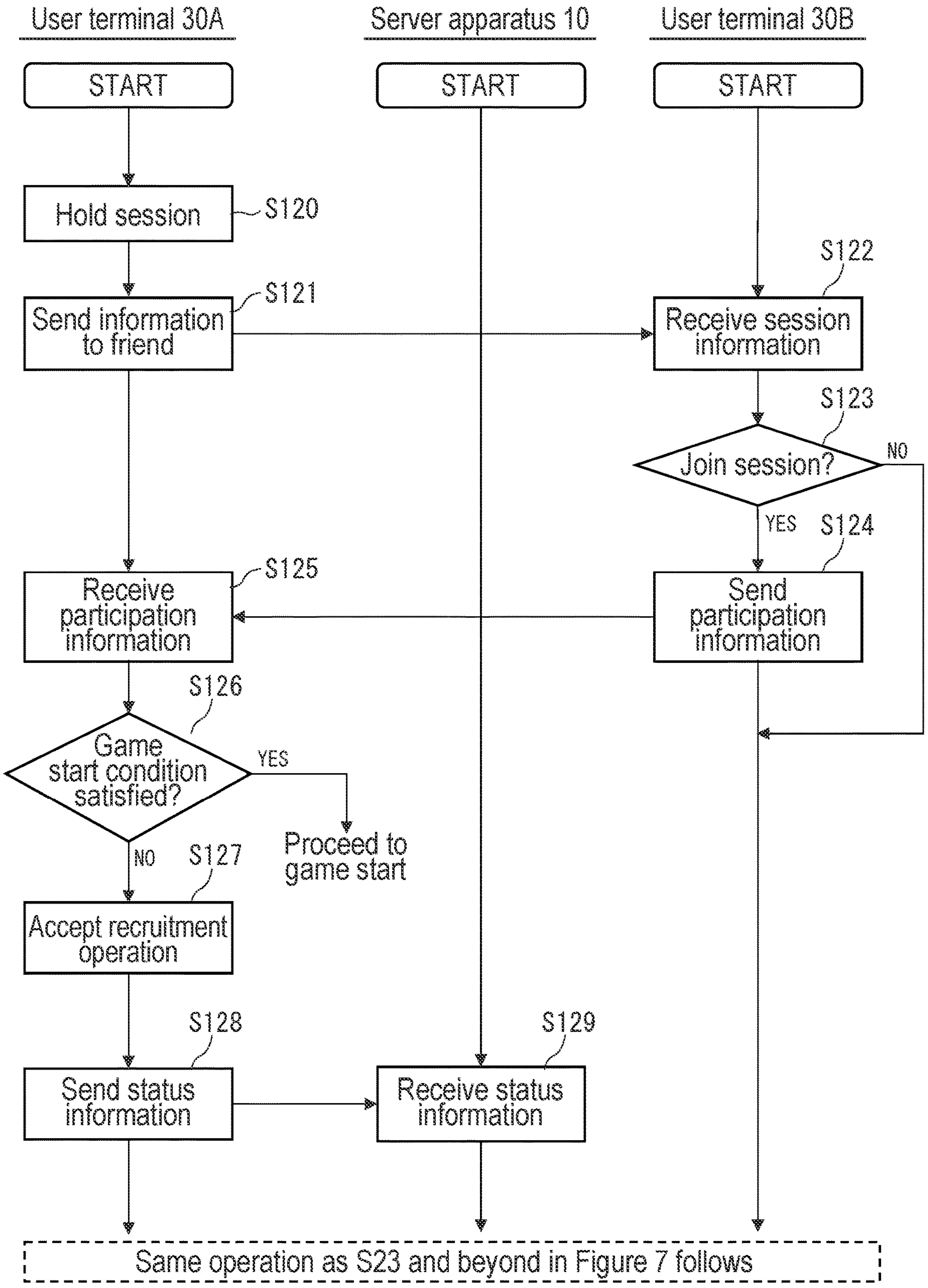
FIG. 21 is a flowchart showing an example of sending session participation information as status information by means of the information processing system of a fourth embodiment.

FIG. 21 is a flowchart showing an operation to send information on a session as status information in the information processing system of the fourth embodiment. As shown in FIG. 21, the user of the user terminal 30A first operates to hold a session (S120).

The status information sending means 37 of the user terminal 30A sends information indicating the holding of the session to the user terminal 30B of a user who is registered as a friend by the user of the user terminal 30A (S121), and the user terminal 30B receives the information on the session (S122). The user terminal 30B determines whether its user operates to join the session or not (S123), and if it is determined that the operation to join the session is performed (YES at S123), the user terminal 30B sends session participation information to the user terminal 30A (S124). Upon receiving the session participation information sent from the user terminal 30B (S125), the user terminal 30A determines whether a session start condition is satisfied or not (S126). If it is determined that the session start condition is satisfied (YES at S126), the user terminal 30A starts the session.

If it is determined that the session start condition is not satisfied (NO at S126), the user terminal 30A accepts an operation to recruit participants for the session from the user (S127). Upon accepting the operation to recruit participants from the user, the user terminal 30A sends status information to the server apparatus 10 by means of the status information sending means 13 (S128). The status information receiving means 12 of the server apparatus 10 receives the status information sent from the user terminal 30A (S129), and after this the information processing system 1 performs the same operation as described with FIGS. 7 and 8.

The information processing system of the fourth embodiment sends information on a session to friends of a user holding the session and encourages participation before sending session participation information as status information to user terminals 30 of users for whom the same string is set. There could be an inconvenience where the user wants to play with the user's friends but session participation information is sent to other users, who join the session. The configuration of the embodiment allows the user to play with familiar friend users.

While in the fourth embodiment the information processing system whose configuration is basically the same as the information processing system of the first embodiment is taken as an example, the configuration in which friends are recruited to join a session with priority can be adopted in the second or third embodiment.

While an information processing system of the disclosure has been described in detail above with embodiments, the disclosure is not limited to the above-described embodiments. While in the above embodiments an example is cited where session participation information and status update information are sent as status information, status information to be sent may be session participation information only or status update information only.

While the information processing systems of the first and second embodiments described before are configured for a user terminal to set a string, receive status information from other user terminals for which the same string is set, and send the user terminal's own status information to the other user terminals, they may be configured to restrict the sending of the status information. That is, a user terminal may accept a setting of a status information sending restriction condition, and if the set status information sending restriction condition is satisfied, the status information sending means of the user terminal may restrict the sending of status information toward other terminals. This allows for meeting a need to want to receive other users' status information but not to want to send the user's own status information. The status information sending restriction condition may be set collectively, or whether it is acceptable to send status information or not may be confirmed each time it can be sent.

While in the information processing systems of the above-described embodiments examples are cited in which status information is sent and received via a server apparatus, status information may be sent directly from one user terminal to another user terminal.

I claim:

1. A non-transitory storage medium having stored therein instructions that, when executed by a computer of a first terminal that is associated with a first user among a plurality of networkable terminals, are configured to cause the computer to perform operations comprising:

executing a specified application and, while executing the specified application, acquiring, from a second terminal of a second user, status information indicating a status of the specified application being executed on the second terminal;

placing a second user character associated with the second user of the second terminal that has sent the acquired status information in a virtual space in a specified scene in the specified application;

controlling a first user character associated with the first user and placed in the virtual space, and moving the first user character based on the first user's move operation input;

based on determination that the first user character and the second user character are at least in a specified positional relationship in the virtual space, presenting a first image corresponding to the status information acquired from the second user of the second user character;

based on determination of a specified operation input given by the first user in the specified scene, presenting a list image for listing notifications about the acquired status information; and based on display of the list image, presenting a second image corresponding to information on a notification specified by the first user among the notifications listed in the list image.

2. The non-transitory storage medium according to claim 1, wherein in the operation of presenting a list image, presenting the list image for listing notifications about a first number of pieces of status information among the acquired status information, and wherein in the operation of placing a second user character, for each of a second number of pieces of status information among the acquired status information where the second number is smaller than the first number, placing in the virtual space the second user character of the second user of the second terminal that has sent the status information.

3. The non-transitory storage medium according to claim 2, wherein in the operation of placing a second user character, for each of the second number of newly acquired pieces of status information among the acquired status information, placing in the virtual space the second user character of the second user of the second terminal that has sent the status information.

4. The non-transitory storage medium according to claim 1, wherein in the operation of acquiring status information, acquiring the status information in at least one of cases where another scene has transitioned to the specified scene, where the list image has been presented based on the specified operation input, and where a specified period of time has elapsed since the list image was presented.

5. The non-transitory storage medium according to claim 1, wherein in the operation of placing a second user character, maintaining a position of the second user character placed from when a specified update condition was last satisfied until the specified update condition is satisfied again regardless of the status information acquired after the specified update condition was last satisfied.

6. The non-transitory storage medium according to claim 1, wherein in the operation of presenting a list image, maintaining the list image displayed when a specified update condition was last satisfied until the specified update condition is satisfied again regardless of the status information acquired after the specified update condition was last satisfied.

7. The non-transitory storage medium according to claim 1, wherein the status information belongs to at least two categories, and wherein in the operation of placing a second user character, placing in the virtual space the second user character of the second user of the second terminal that has sent the status information belonging to a specified category among the acquired status information.

8. The non-transitory storage medium according to claim 7, wherein the category is the type of the specified scene, and wherein in the operation of placing a second user character, placing in the virtual space the second user character of the second user of the second terminal that has sent the status information related to the specified scene of the present among the acquired status information.

9. The non-transitory storage medium according to claim 1, wherein the number of second user characters placed in the virtual space is one or less for each second user, and wherein in the operation of presenting a list image, presenting a plurality of pieces of status information acquired from each second user.

10. The non-transitory storage medium according to claim 1, wherein in the operation of placing a second user character, displaying the second user character and an image indicating the type of the status information associated with the second user character.

11. The non-transitory storage medium according to claim 1, the instructions further causing the computer to perform operation of setting an arbitrary string specified by the first user in association with the first user, wherein in the operation of acquiring status information, acquiring the status information from second terminal of second user for whom the same string set in association with the first user is set.

12. The non-transitory storage medium according to claim 11, wherein in the operation of setting an arbitrary string, setting a single string specified by the first user in association with the first user.

13. The non-transitory storage medium according to claim 1, wherein the operations further comprise:

based on determination that the status information indicates that the second user has hosted a session, which is for playing a game with a plurality of people, or that the second user has joined as a guest a session hosted by a user different from the second user, allowing the first user to join the session by establishing communication at least between the first terminal and the second terminal in response to the first user's request to join the session.

14. The non-transitory storage medium according to claim 13, wherein in the operation of establishing communication, establishing a peer-to-peer (P2P) network connection between the first terminal and the second terminal to allow the first user to join the session.

15. The non-transitory storage medium according to claim 1, wherein in the operation of acquiring status information, acquiring the status information from the second terminal via a server.

16. The non-transitory storage medium according to claim 1, wherein in the operation of acquiring status information, acquiring the status information indicating a status of the specified application on the second terminal after the user terminal has connected to the Internet.

17. The non-transitory storage medium according to claim 1, the instruction causing the computer to perform operation of placing a target object in the virtual space in the specified scene, accepting an operation input to cause the user character to perform a specified action, and destroying the target object if the specified action is performed on the target object.

18. One of a plurality of networkable information processing apparatuses, the information processing apparatus used by a first user comprising: a processor and a memory coupled thereto, the processor being configured to control the information processing system to at least:

executing a specified application and, while executing the specified application, acquiring, from a second terminal of a second user, status information indicating a status of the specified application being executed on the second terminal;

placing second user character associated with the second user of the second terminal that has sent the acquired status information in a virtual space in a specified scene in the specified application;

controlling a first user character associated with the first user and placed in the virtual space, and moving the first user character based on the first user's move operation input;

if the first user character and the second user character are at least in a specified positional relationship in the virtual space, presenting a first image corresponding to the status information acquired from the second user of the second user character;

if a specified operation input is given by the first user in the specified scene, presenting a list image for listing notifications about the acquired status information; and in a case where the list image is displayed, presenting a second image corresponding to information on a notification specified by the first user among the notifications listed in the list image.

19. An information processing system including a first terminal of a first user and a second terminal of a second user, wherein the first terminal comprises a processor and a memory coupled thereto, the processor being configured to control the first terminal to at least:

executing a specified application and, while executing the specified application, acquiring, from the second terminal, status information indicating a status of the specified application being executed on the second terminal;

placing second user character associated with the second user of the second terminal that has sent the acquired status information in a virtual space in a specified scene in the specified application;

controlling a first user character associated with the first user and placed in the virtual space, and moving the first user character based on the first user's move operation input;

if the first user character and the second user character are at least in a specified positional relationship in the virtual space, presenting a first image corresponding to the status information acquired from the second user of the second user character;

if a specified operation input is given by the first user in the specified scene, presenting a list image for listing notifications about the acquired status information; and in a case where the list image is displayed, presenting a second image corresponding to information on a notification specified by the first user among the notifications listed in the list image.

20. An information processing method executed by a computer of a first terminal of a first user among a plurality of networkable terminals, the information processing method comprising the steps of:

executing a specified application and, while executing the specified application, acquiring, from a second terminal of a second user, status information indicating a status of the specified application being executed on the second terminal;

placing second user character associated with the second user of the second terminal that has sent the acquired status information in a virtual space in a specified scene in the specified application;

controlling a first user character associated with the first user and placed in the virtual space, and moving the first user character based on the first user's move operation input;

determining that the first user character and the second user character are at least in a specified positional relationship in the virtual space and based on thereon, presenting a first image corresponding to the status information acquired from the second user of the second user character;

determining a specified operation input is given by the first user in the specified scene and based on thereon, presenting a list image for listing notifications about the acquired status information; and when the list image is displayed, presenting a second image corresponding to information on a notification specified by the first user among the notifications listed in the list image.

* * * * *